United States Patent [19]

Takatori et al.

[11] Patent Number: 5,331,639
[45] Date of Patent: Jul. 19, 1994

[54] METHOD AND APPARATUS FOR FRAME PHASE CONVERSION OF SIGNAL HAVING FRAME STRUCTURE

[75] Inventors: Masahiro Takatori, Kokubunji; Yukio Nakano, Hachioji; Keiichi Ishida, Yokohama; Takashi Mori, Yokohama; Yoshihiro Ashi, Yokohama; Tadayuki Kanno, Yokohama; Hiromi Ueda, Yokohama, all of Japan

[73] Assignees: Hitachi, Ltd.; Nippon Telegraph and Telephone Corp., both of Tokyo, Japan

[21] Appl. No.: 609,647

[22] Filed: Nov. 6, 1990

[30] Foreign Application Priority Data

Nov. 10, 1989 [JP] Japan .................................. 1-290997

[51] Int. Cl.[5] .............................................. H04J 3/06
[52] U.S. Cl. ................................ 370/100.1; 370/105.1; 375/118
[58] Field of Search ................ 370/99, 84, 100.1, 112, 370/105.1; 375/118

[56] References Cited

U.S. PATENT DOCUMENTS 4,535,446  8/1985  Mountain ............................. 370/84
4,941,141  7/1990  Hayano .............................. 370/100.1
5,128,939  7/1992  Takatori et al. ...................... 370/100.1

OTHER PUBLICATIONS

NTT Research and Development Report, vol. 28, No. 7, 1987, pp. 210–214.
IX the Plenary Assembly-Document 142 Study Group XVIII-Report R57 (pp. 99–107).

Primary Examiner—Stephen Chin
Assistant Examiner—T. Ghebretinsae
Attorney, Agent, or Firm—Antonelli, Terry, Stout & Kraus

[57] ABSTRACT

A method and an apparatus for converting a frame phase of a signal having a frame structure specified in the CCITT recommendations which contains N (N: an integer 2 or above) pieces of frames applied with time-division/multiplex, in which the N pieces of frames are given to N pieces of memories, respectively, a write address is given independently to each memory so that the N pieces of frames are written in the respective memories in a same phase as the phase in the signal, a read address is given independently to each memory so that the N pieces of frames are read out of the respective memories in a same phase as the write phase, a difference between a write address and a read address in each memory is set identical under an initial state, and justification is executed for a frame which is read out of the memory in accordance with a difference between existing write address and read address in each memory, whereby to perform frame phase conversion while maintaining relative phase among respective frames.

35 Claims, 12 Drawing Sheets

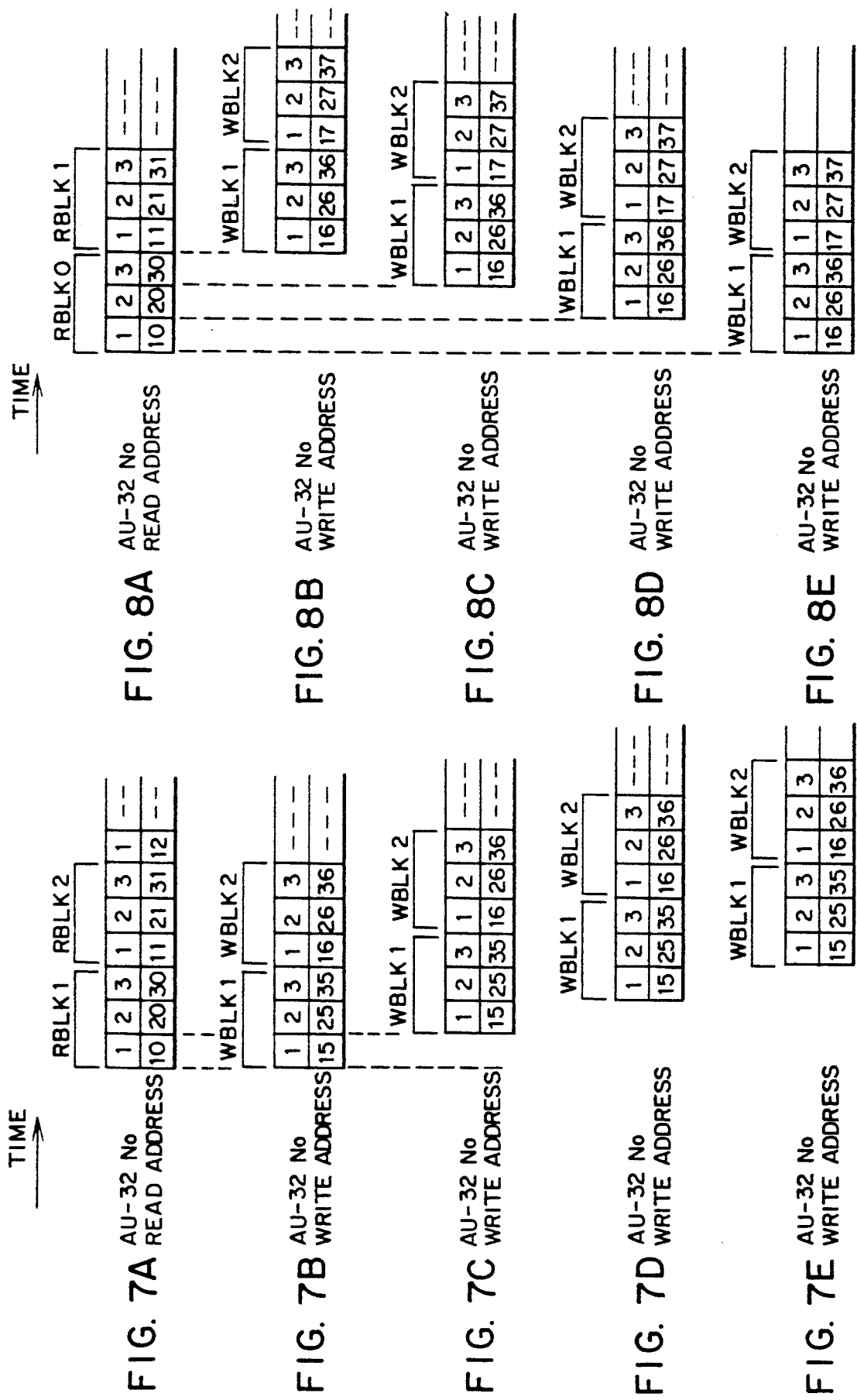

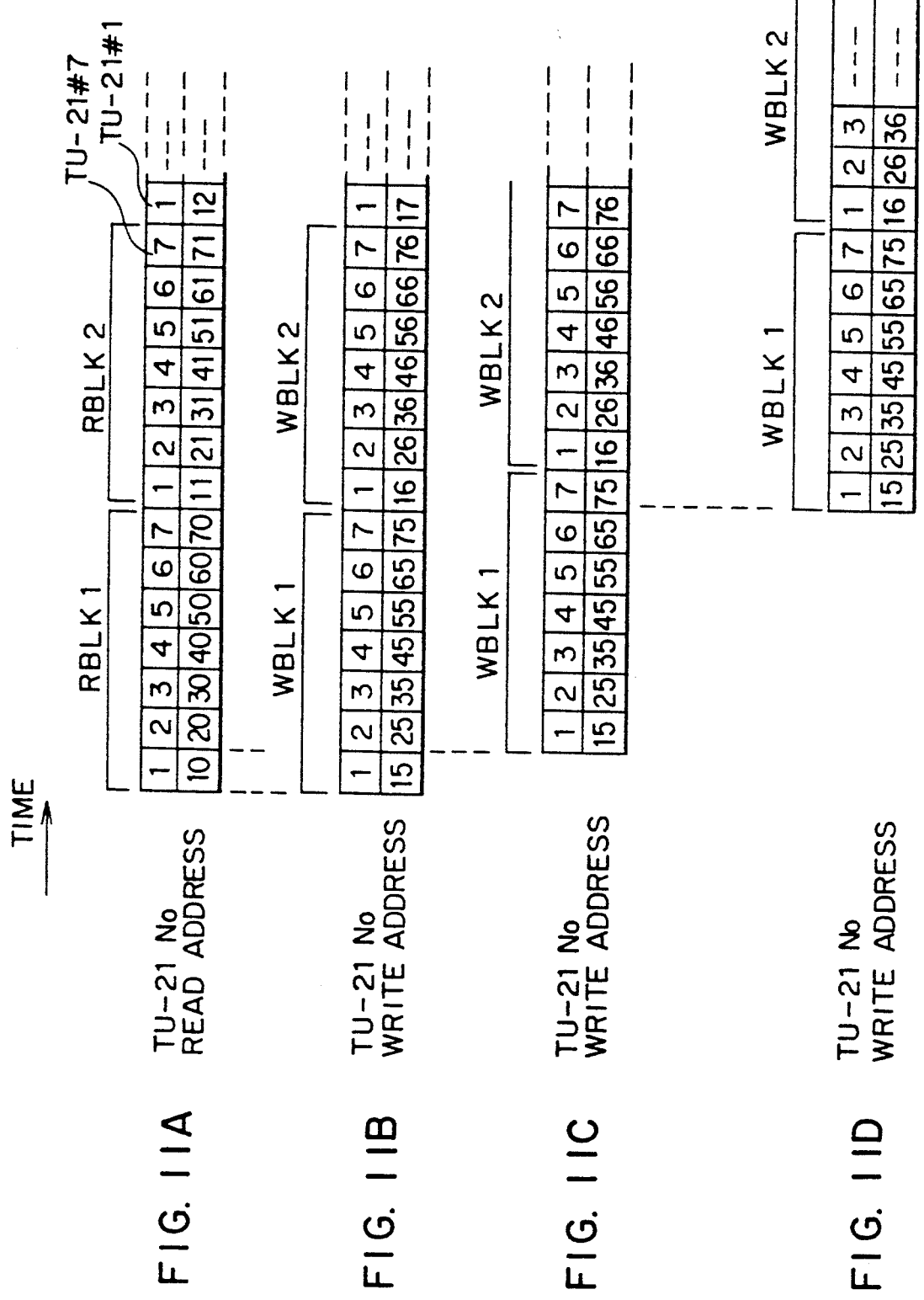

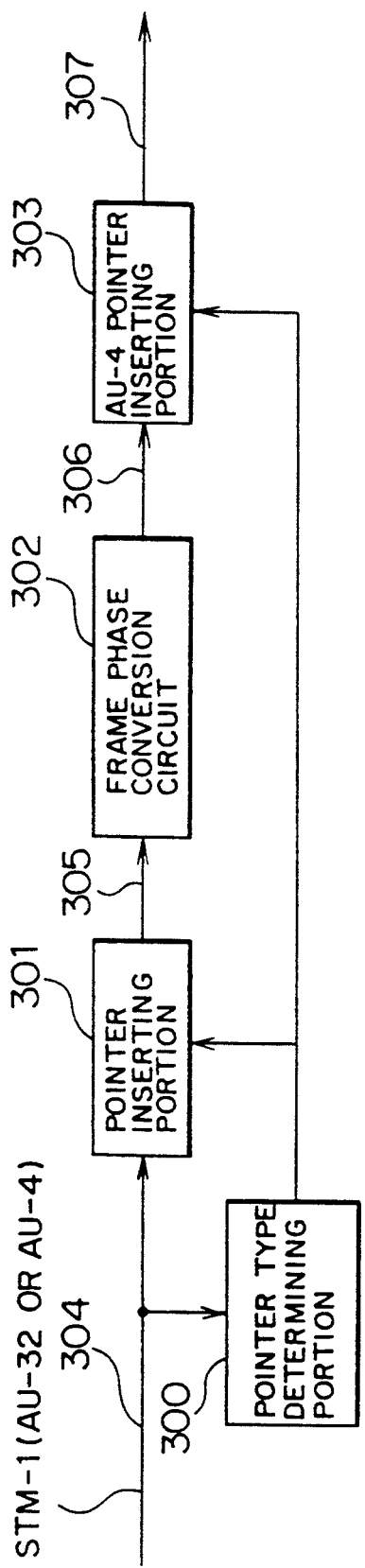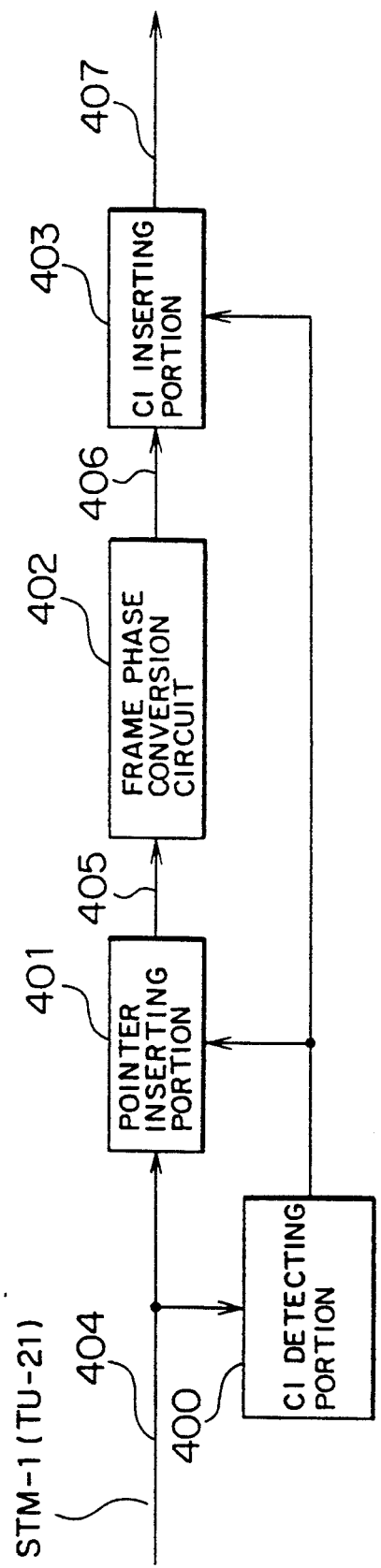

METHOD AND APPARATUS FOR FRAME PHASE CONVERSION OF SIGNAL HAVING FRAME STRUCTURE

BACKGROUND OF THE INVENTION

The present invention relates to a method and an apparatus for frame phase conversion which makes it possible, in an apparatus which transmits with time-division/multiplex one set of signals constituted by a plurality of signals each having a frame structure, to transmit the one set of signals after matching frame phases between an above-mentioned one set of plurality of signals each having a frame structure.

As an example of above-mentioned apparatus, a conventional apparatus in which a frame aligner described in NTT Research and Development Report Vo. 28, No. 7, 1987, pp. 210–214 is provided in each of above-mentioned one set of plurality of signals each having a frame structure so as to arrange phases among above-mentioned one set of plurality of signals each having a frame structure has been proposed.

In CCITT (The International Telegraph & Telephone Consultative) recommendations G. 707, G. 708 and G. 709, such a method that respective sets of a plurality of signals each having a frame structure are transmitted after time-division/multiplex in units of byte is adopted. This frame includes a designator called a pointer, which indicates a position in one frame of information contained in a signal having a frame structure. Further, the signal having a frame structure is provided a function justification. With this function, it is possible to absorb wander produced by temperature change in a transmission line when a frame is transmitted by means of a justification byte. When a frame in accordance with above-mentioned CCITT recommendations is applied with transmit processing in a transmission equipment, the wander is absorbed by using justification.

In this case, in order to match frame phases among one set of plurality of signals each having a frame structure and to guarantee time slot sequence integrity (hereinafter referred to as TSSI. TSSI is an abbreviation of Time Slot Sequence Integrity.), justification has to be executed simultaneously on one set of plurality of signals each having a frame structure.

SUMMARY OF THE INVENTION

It is an object of the present invention to guarantee TSSI among above-mentioned one set of plurality of signals each having a frame structure which pass through the same transmission line when frame phase conversion is effected.

In order to achieve such an object, according to one aspect of the present invention, in a method and an apparatus for converting a frame phase of a signal having a frame structure defined in the CCITT recommendations which contains N (N: an integer 2 and above) pieces of frames, signals each having a frame structure are stored in a memory in succession, and are read so that a relative phase, in a signal having a frame structure in each of N pieces of frames which are read out of the memory is identical to the relative phase in a signal having a frame structure of the relevant frame which is input to the memory. That is, frame phase conversion is effected while maintaining relative phases among N pieces of frames in a signal having a frame structure.

According to another aspect of the present invention, in a method and an apparatus for converting a frame phase of a signal having a frame structure containing N (N: an integer of 2 or above) pieces of frames applied with time-division/multiplex, N pieces of frames are given to N pieces of memories, respectively, write addresses are given independently to respective memories so as to write N pieces of frames in respective memories in the same phase as that in above-mentioned signal, read addresses are given independently to respective memories so as to read above-mentioned N pieces of frames out of above-mentioned respective memories in the same phase as the write phase, a difference between the write address and the read address in each memory is set initial, and justification is executed for a frame which is read out of the above-mentioned memory in accordance with a difference between the write address and the read address at present in each memory.

That is, an input signal having a frame structure containing N pieces of frames applied with time-division/multiplex is written in N pieces of memories provided independently for every N pieces of frames in accordance with input frame phases, respectively, and respective frames are read in accordance with the same phase as the write phase. At this time, the difference between the write address and the read address given to respective memories under an initial state is made identical with respect to respective frames. Thus, the delay time for respective frames to pass through the memory becomes always equal to each other. Therefore, frame phase conversion is effected while holding the relative phase in a signal of respective frames. Also, determining conditions for executing justification in accordance with the difference between the write address and the read address of each memory are made the same among respective frames. Furthermore, a difference between a read address and a write address in which justification is not executed is preferably set to a single value. Accordingly, since shifting of frame phases due to execution of justification is effected at the same time in respective frames, slippage of frame phases will never occur among frames.

Namely, in the present invention, a control method of phase conversion memories is made common among a plurality of frames, and the state in which justification is not effected, i.e., a difference between a write address and a read address in each memory is set to a single value. Thus, it is possible to transmit a plurality of frames while preserving the relative phase between mutual frames, and guarantee TSSI between signals which pass through the same transmission line.

According to another aspect of the present invention, each of above-mentioned respective memories is divided into two stages, that is, a first memory which applies frame phase conversion to an input signal and a second memory which applies frame phase conversion further to an output frame of the first memory, above-mentioned justification is executed in accordance with an address difference for output frames of respective second memories simultaneously with executing above-mentioned frame phase conversion for the first and the second memories, above-mentioned write addresses to above-mentioned respective first memories are given in response to a first common clock signal, above-mentioned read addresses to above-mentioned respective first memories and above-mentioned write addresses and read addresses to above-mentioned respective second memories are given in response to a second common clock signal, and rereading or read skipping is effected in accordance with an address difference for a specific address of above-mentioned first memory.

Accordingly, change-over of a synchronizing clock of an input frame is performed in respective first memories, and the wander due to the difference between frequencies of a first clock and a second clock can be absorbed while maintaining identity of the frame phase.

BRIEF DESCRIPTION OF THE DRAWINGS

FIGS. 7A through 7E are for explaining the operation of AUPJ in the second embodiment;

FIGS. 8A to 8E are for explaining the operation of AUNJ in the second embodiment;

FIGS. 11A to 11D are for explaining the operation of TUPJ in the third embodiment;

FIG. 12 is a block diagram showing a structure of a fourth embodiment;

FIG. 14 is a block diagram showing a structure of a fifth embodiment; and

DESCRIPTION OF THE PREFERRED EMBODIMENTS

Figure 1:
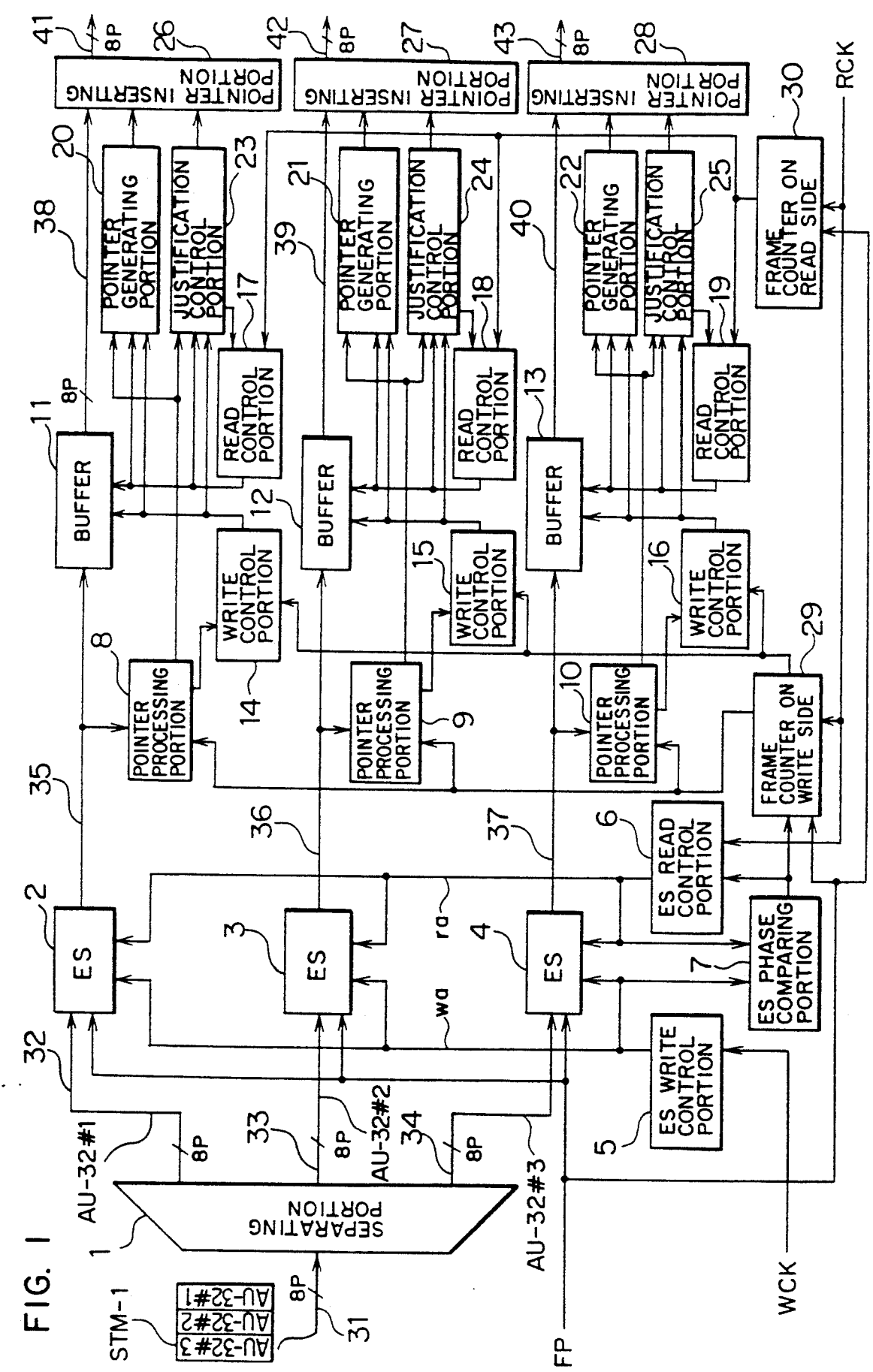
FIG. 1 is a block diagram showing a structure of a first embodiment of a frame phase conversion apparatus according to the present invention.

Embodiments of the present invention will be described hereafter with reference to the accompanying drawings. Besides, in these drawings, parts having same reference numerals have the same functions.

A first embodiment of the present invention will be described with reference to FIG. 1. In a frame phase conversion circuit of the present embodiment shown in FIG. 1, a reference numeral 1 denotes a separating portion which separates a signal applied with time-division/multiplex in the unit of byte on a highway 31 and outputs the signal to highways 32, 33 and 34, 2 denotes a memory for storing a signal on the highway 32 such as an elastic store memory (hereinafter referred to as ES), 3 denotes an ES for storing a signal on the highway 33, and 4 denotes an ES for storing a signal on the highway 34. Further, 5 denotes an ES write control portion which indicates write addresses to respective ESs in writing a signal in ES2, ES3 and ES4 in accordance with a write clock (hereinafter referred to as a WCK) and 6 denotes an ES read control portion which indicates addresses in reading signals out of ES2, ES3 and ES4 to respective ESs 2 to 4 in accordance with a read clock (hereinafter referred to as an RCK). The clock WCK is a clock extracted from a received signal on the highway 31, and the clock RCK is a clock from a clock generator (not shown) included in the apparatus shown in FIG. 1. 7 denotes an ES phase comparing portion which compares write addresses given to ES2, ES3 and ES4 with read addresses, 11 denotes a buffer memory (hereinafter referred to as a buffer) which stores a signal which has been read out of the ES2 on a highway 35, 12 denotes a buffer which stores a signal which has been read out of the ES3 on a highway 36, 13 denotes a buffer which stores a signal which has been read out of the ES4 on a highway 37, 8 denotes a pointer processing portion for processing a pointer portion of a signal on the highway 35, 9 denotes a pointer processing portion for processing a pointer portion of a signal on a highway 36, 10 denotes a pointer processing portion for processing a pointer portion of a signal on a highway 37, 14 denotes a write control portion which indicates the address in writing a signal in the buffer 11, 15 denotes a write control portion which indicates the address in writing a signal in a buffer 12, 16 denotes a write control portion which indicates an address in writing a signal in a buffer 13, 17 denotes a read control portion which indicates an address in reading a signal out of the buffer 11, 18 denotes a read control portion which indicates an address in reading a signal out of the buffer 12, 19 denotes a read control portion which indicates an address in reading a signal out of the buffer 13, 20 denotes a pointer generating portion which generates a pointer added to a signal read out of the buffer 11, 21 denotes a pointer generating portion which generates a pointer added to a signal which is read out of the buffer 12, 22 denotes a pointer generating portion which generates a pointer added to a signal which is read out of the buffer 13, 23 denotes a justification control portion which instructs execution of justification based on a difference between a write address and a read address given to the buffer 11, 24 denotes a justification control portion which instructs execution of justification based on a difference between a write address and a read address given to the buffer 12, 25 denotes a justification control portion which instructs execution of justification based on a difference between a write address and a read address given to the buffer 13, 26 denotes a pointer inserting portion which inserts a pointer into a signal on a highway 38, 27 denotes a pointer inserting portion which inserts a pointer into a signal on a highway 39, 28 denotes a pointer inserting portion which inserts a pointer into a signal on a highway 40, 29 denotes a frame counter on a write side of above-mentioned buffers 11, 12 and 13 and 30 denotes a frame counter on read sides of above-mentioned buffers 11, 12 and 13.

Figure 2:
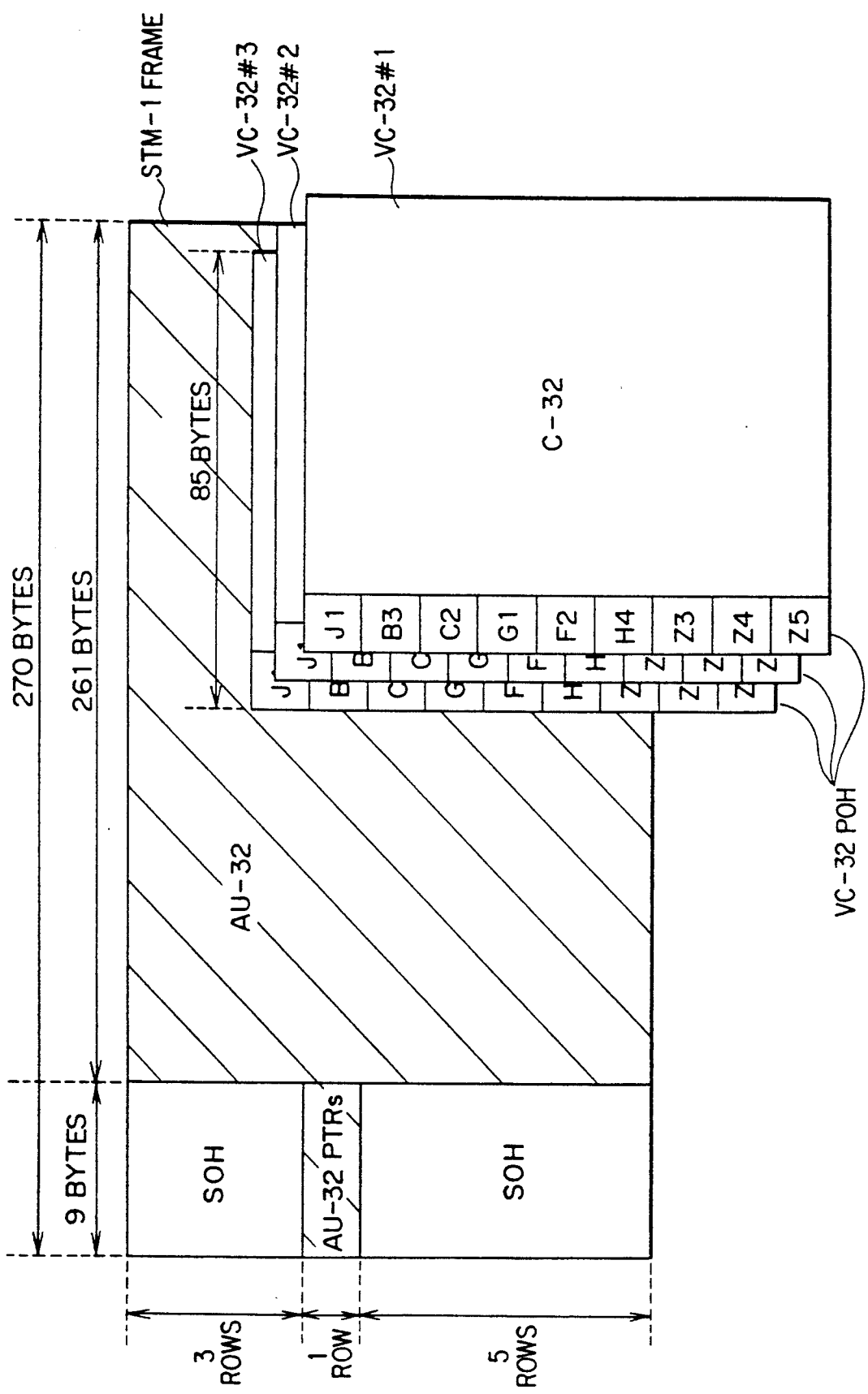
FIG. 2 is a configuration diagram of a signal (STM-1) which becomes an object of the first embodiment.

Prior to explaining the operation of the above-mentioned embodiment, a format of a signal which is an object to be processed will be described. A signal which is the object to be processed, i.e., a signal on the highway 31 is an STM (Synchronous Transfer Mode)-1 frame specified in the recommendations G. 707, 708 and 709 of the International Telegraph & Telephone Consultative Committe (CCITT). FIG. 2 shows an STM-1 frame. The type of an employed pointer is an AU (Administration Unit)-32 pointer (AU-32 PTRs). In the frame are contained three VC (Virtual Container)-32s, viz., VC-32#1, VC-32#2 and VC-32#3 containing information are contained by byte multiplexing, and corresponding pointers show head positions in the STM-1 frame of VC-32#1 thru #3, respectively. Each of AU-32#1 thru #3 is a hatched portion including the AU-32 pointer corresponding to one of corresponding VC- 32#1 thru #3. Besides, AU-32#1 thru #3 added with section overhead (SOH) are referred hereinafter as AU-32#1 thru #3, respectively, for convenience' sake.

Figure 3:
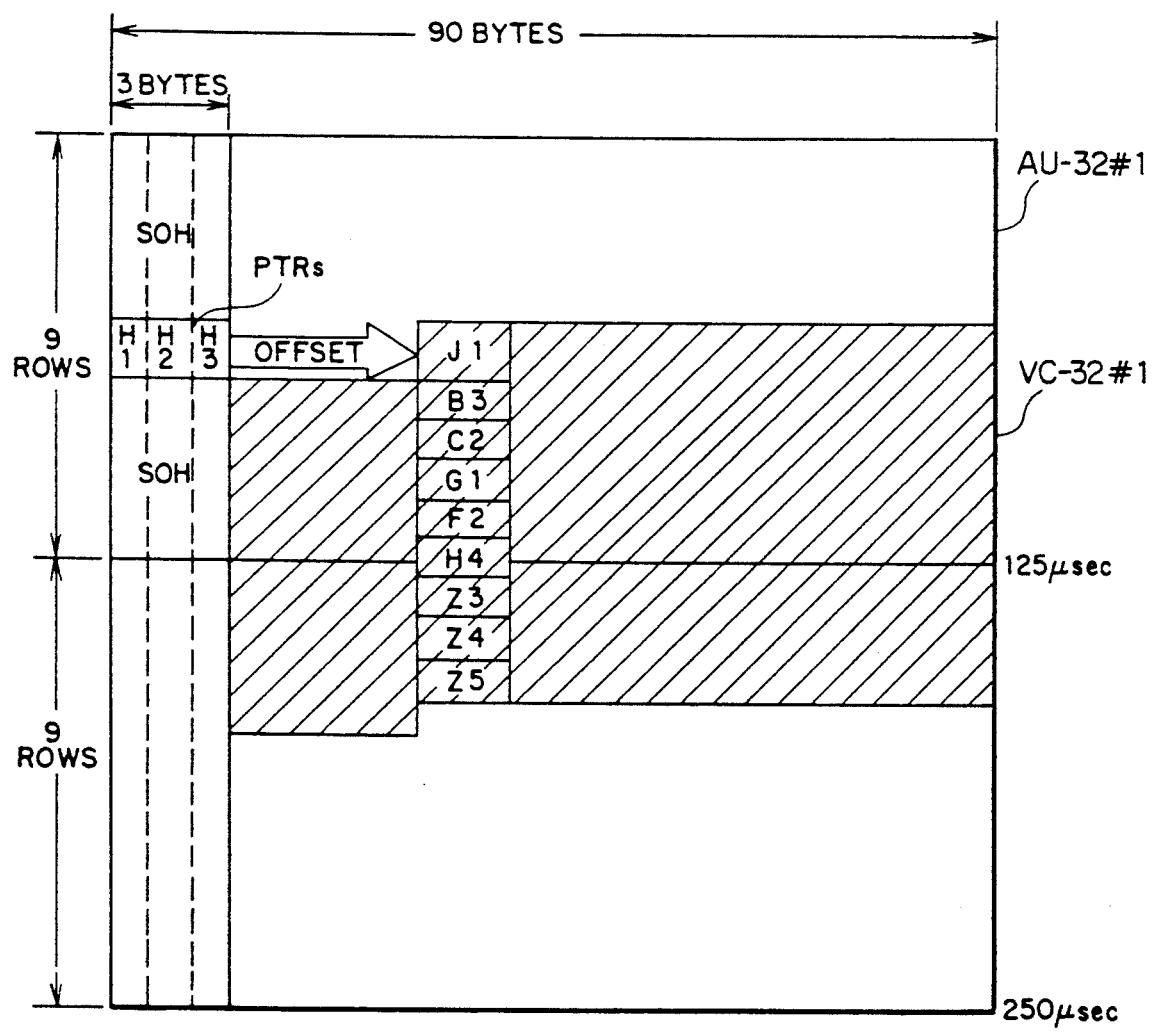
FIG. 3 is a configuration diagram of a signal (AU-32) which becomes an object of the first embodiment.

Returning to FIG. 1, respective AU-32#1-#3 of an STM-1 frame signal shown in FIG. 2 are input with eight bits in parallel successively under a state that byte synchronization is obtained from the highway 31. The separating portion 1 separates the STM-1 frame into three pieces of AU-32s (AU-32#1 thru #3), and sends each of them onto the highways 32, 33 and 34. Here, the AU-32 on the highway 32 is AU-32#1, the AU-32 on the highway 33 is AU-32#2 and the AU-32 on the highway 34 is AU-32#3. FIG. 3 shows a separated AU-32 (here, AU-32#1). Here, it is assumed that AU-32#1 extends over two frames. Also, only two frames are shown in the figure for simplicity' sake. The separating portion 1 applies AU-32#1 thru #3 to the ESs 2 to 4 in the same phase (same timing). The ES write control portion 5 generates a write address in accordance with the WCK, and writes above-mentioned AU-32#1-#3 in ES2 to ES4, respectively. At this time, a same write address wa is given to ES2 to ES4 simultaneously. To respective ESs is given a frame pulse FP extracted from a signal on the highway 31, and write is performed in response thereto. The ES read control portion 6 operates in accordance with the RCK, and reads above-mentioned AU-32#1-#3 out of SS2-SS4, respectively. At this time, a same read address ra is given simultaneously to ES2-ES4. Here, there is a difference in general between the speeds (frequencies) of the WCK and the RCK. This is caused because of such a reason that the speed (frequency) of the clock WCK which is sent from other transmission equipment through a transmission line is varied due to temperature change in the transmission line and the like. Therefore, in case the difference becomes not to meet a predetermined standard, the difference is absorbed by reading twice in succession or skipping reading of the designated address. That is, the ES phase comparing portion 7 compares the write address wa with the read address ra, detects the variation of address difference between both, and directs rereading (continuous rereading twice) or read skipping of the designated address of the ES.

Figure 4A:
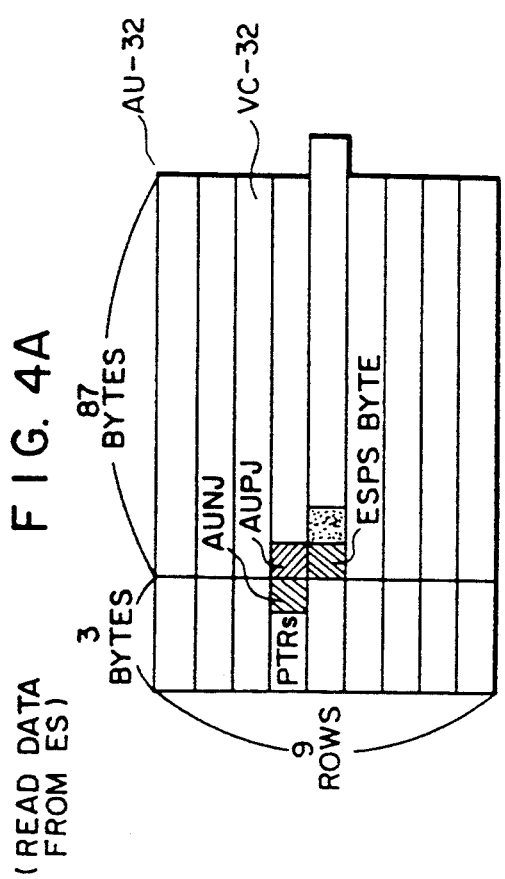

First, a case in which the read address gets near the write address because the speed (frequency) of the RCK is faster (higher) as compared with that of the WCK will be explained. When the ES phase comparing portion 7 detects the variation in the difference between both addresses and detects that the difference between both addresses has reached below a predetermined value (for example, the address difference is changed to 4 from 5), rereading of the ES is instructed, thereby to insert ES Positive Justification (hereinafter referred to as ESPS (Positive Stuff)) into above-mentioned respective AU-32s at the same time. That is, the ES phase comparing portion 7 gives instruction for rereading to the read control portion 6. With this, the read control portion 6 rereads the specific address of respective ESs. Namely, the control portion 6 outputs the same read address to 1 byte adjacent to SOH in the fifth row and the next one byte for instance. An example of a position where ESPS byte is inserted is shown with oblique lines in FIG. 4A. In FIG. 4A, the frame (AU-32) which is read out of respective ESs is shown, and the same data, viz., the same data which are reread out of the same address of the ES are shown in 1 byte (ESPS byte) of the hatched portion and 1 byte in the following dotted portion. Only the portion of VC-32 of AU-32 shown in FIG. 3A is written in the buffers 11-13. Above-mentioned ESPS byte is not written in the buffers 11-13. Therefore, only the portion within the heavy line frame shown in FIG. 4A is written.

This is performed in a manner as described hereunder. The frame counter 29 starts counting of the RCK in response to the frame pulse FP, and gives the counted value to respective write control portions 14-16. Respective write control portions 14-16 generate write addresses in accordance with the counted value of the frame counter 29, but the write address wa is neither renewed nor output within the counted values (0 to 2 for instance) of the frame counter 29 corresponding to SOH and PTRs of AU-32 which are input to the buffers 11-13.

On the other hand, the ES phase comparing portion 7 directs rereading (or read skipping) to the frame counter 29 on the write side along with the ES read control portion 6. Thus, the frame counter 29 performs renewal and suspension (or renewal twice) of the counted value for the next RCK in response to the above-mentioned indication, respectively. Thus, in the case of ESPS, respective write control portions 14-16 generate the same write address on the portion corresponding to the ESPS byte of AU-32 and a next 1 byte (dotted portion in FIG. 4A). Therefore, they are rewritten. That is, next one byte data are overwritten on the ESPS byte. Accordingly, only the heavy line portion of FIG. 4A is written in the buffers 11-13 and the ESPS byte is not written in the buffer.

Since rewriting is performed as described above in case ESPS is generated, approach occurs between the write address and the read address of respective buffers 11-13. When respective justification control portions 23-25 detect that the address difference becomes under a predetermined value (from 5 to 4 for instance) at the same time, AU positive justification (hereinafter referred to as AUPJ) is directed to respective read control portions 17-19. When AUPJ is executed, read control portions 17, 18 and 19 stop reading out of the buffers 11-13 at positions (hatched position in FIG. 4B) of AU positive justification byte specified in CCITT recommendations G. 707, 708 and 709. With this, the AUPJ byte is inserted at above-mentioned position F. Thus, VC-32 which is output from the buffers 11-13 appears as shown in a heavy line portion in FIG. 4B. Besides, the write addresses, under an initial state among respective buffers 11-13 are identical, and the read addresses are also identical among respective buffers. This is achieved by setting the write addresses of respective write control portions 14-16 and the read addresses of respective read control portions 17-19 to a predetermined value at the time of connecting a power supply of the equipment at the time of restarting the equipment after suspension and so on.

Next, a case in which a write address gets near a read address because of the slower speed of the RCK as compared with the WCK will be explained.

When the ES phase comparing portion 7 detects that an address difference exceeds a predetermined value (for example, the address difference becomes 6 from 5), it directs the ES read control portion 6 to skip reading of the last one byte of SOH in the fifth row for instance. Namely, the control portion 6 outputs a read address of next one byte at the timing of reading the last one byte of SOH in the fifth row, thereby to perform ES Negative Justification (hereinafter referred to as ESNS (Negative Stuff)).

Figure 5A:
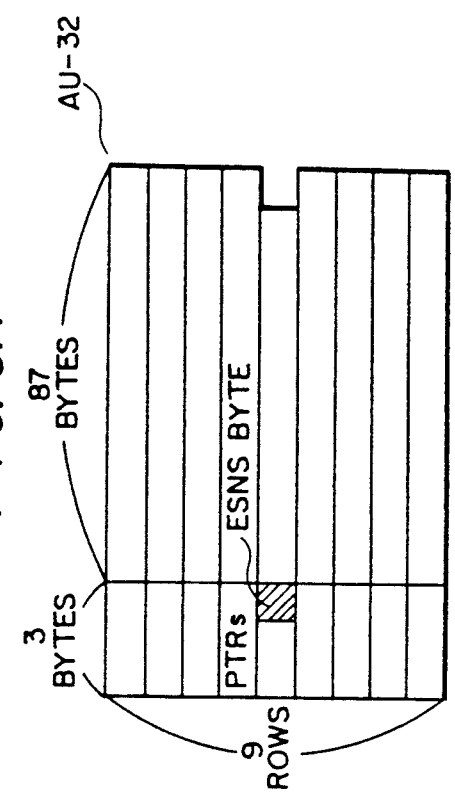
FIGS. 4A, 4B, 5A and 5B are configuration diagrams of a signal (AU-32) for explaining justification which is performed in the first embodiment.
Figure 5B:
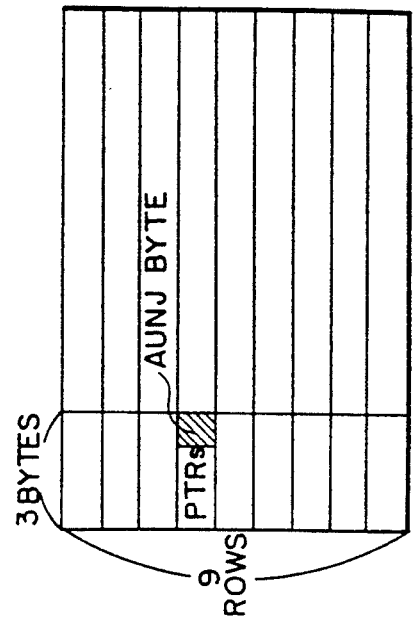

FIG. 5A shows AU-32 which is read out of respective ESs, and also shows a position to conduct read skipping with oblique lines. Thus, at the address position in a hatched portion (ESNS byte) in FIG. 5A, data of one byte portion located next to SOH are read out of respective ESs 2–4. As a result, one frame of AU-32 which is output from the ES becomes shorter than normal by one byte portion. Only VC-32 portions of respective AU-32s are written in the buffers 11–13. That is, the data in the heavy line portion including the ESNS byte in FIG. 5A are written in the buffers. As described above, the ES phase comparing portion 7 directs read skipping also to the frame counter 29 on the read side. Therefore, the frame counter 29 performs renewal of the counted value twice with respect to the next RCK in response to above-mentioned direction. Thus, since respective write control portions 14–16 generate next write addresses a portion corresponding to the ESNS byte of AU_32 in the case of ESNS, the data at the ESNS byte position shown in FIG. 5A are written in the next address (address next to SOH). Therefore, the data in the fifth row where the ESNS byte exists are written in the next address dislocated by one byte, respectively. As a result, only the heavy line portion of FIG. 5A is written in the buffers 11–13. In case read skipping occurs as described above, approach is produced between the write address and the read address of respective buffers 11–13. When respective justification control portions 23–25 detect simultaneously that the address difference exceeds a predetermined value, AU negative justification (hereinafter referred to as AUNJ) is directed to the read control portions 17–19. When AUNJ is executed, the read control portions 17, 18 and 19 read out of the buffers 11–13 at a position (hatched position in FIG. 5B) of AU negative justification byte specified in the CCITT recommendations G. 707, 708 and 709. With this, AUNJ byte is inserted. Accordingly, VC-32 which is output from the buffers 11–13 appears as shown in FIG. 5 (including AUNJ byte). Besides, the inserting position of ESPS byte and ESNS byte is not limited to the fifth row of AU-32, but may be in any one row except the fourth row.

Respective pointer generating portions 20–22 add pointer values extracted in the pointer processing portions 8–10 to VC-32 which has been read out of the buffers pointer inserting portions 26–28 after correcting these pointer values in accordance with the difference between the write address and the read address.

Figure 4B:
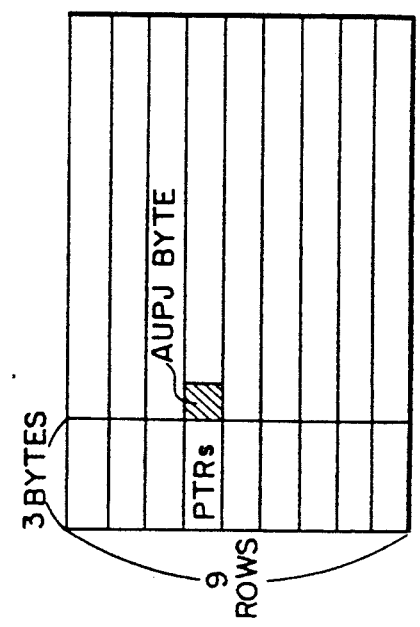

On the other hand, when AU justification is included in AU-32 on the highway 31, viz., when AU positive justification (AUPJ) is included, AUPJ byte is included at a position of the next byte of the pointer PTRs in the fourth row of AU-32 as shown in FIG. 4A. When AU negative justification (AUNJ) is included, AUNJ byte is included at a position of the last one byte of pointer PTRs also in the fourth row. These are detected by respective pointer processing portions 8, 9 and 10 and the existence of AUPJ or AUNJ is informed to the write control portions 14–16. Then, respective write control portions 14–16 perform rewriting (or read skipping) to the buffers 11–13 in response to the existence of AUPJ (or AUNJ) and do not perform writing into the buffers 11–13 of AUPJ (or AUNJ). When AUPJ (or AUNJ) is existent in AU-32 on the highways 32–37, approach between the write address and the read address to respective buffers is produced. Thus, AUPJ byte or (AUNJ byte) is inserted into AU-32 which is read out of the buffers in a similar method as described above by means of justification control portions 23–25 (FIG. 4B and FIG. 5B). In such a manner, ESPS byte. (ESNS byte) can be considered with respect to AUPJ byte (AUNJ byte) in the output of the buffers.

Now, when AUPJ (AUNJ) is executed in the buffers 11–13 by inserting ESPS byte (ESNS byte) at the time of reading AU-32 out of the ESs 2–4, if AUPJ (AUNJ) has been already executed on AU-32 which is read out of the buffers 11–13, the AUPJ (AUNJ) is executed in a frame 4 frames after the relevant AU-32. That is, the buffers 11–13 execute AUPJ (AUNJ) without making a distinction between a case in which AUPJ (AUNJ) byte already exists on the highway 31 and a case in which ESPJ-(ESNJ) byte is inserted in an ES due to the speed difference between the clocks WCK and RCK. When both exist, AUPJ (AUNJ) is executed in the relevant frame and in a frame 4 frames thereafter. As described above, ES justification is executed thereby to absorb wander when the difference between the write address and the read address in an ES is dislocated from a predetermined value (1 for example) in the present embodiment. Namely, the address difference which is not applied with justification is adopted as the only value (5 for example).

In the present embodiment, by dividing into two types, ES and buffer, as a memory unit, replacement of a clock (changing-over of a synchronous clock for frame transmission) is performed in one memory (ES).

Further, analog decision whether rereading or read skipping of a specific address of an ES for wander absorption is to be executed or not is performed in one phase comparator, thereby to generate an ES justification byte in respective AU-32#1-#3 at the same time.

Furthermore, since AU justification can be executed in a buffer at a latter stage which is another memory, transmission after arranging frame phase among respective AS-32#1-#3 is made possible.

That is, justification is performed at the same time for wander absorption in memories (ES2-4) at the former stage, and justification is executed in memories at the former stage of justification is executed in each memory independently in accordance with justification byte included originally in a signal on the highway 31 in memories (buffers 11–13) at the latter stage.

Figure 6:
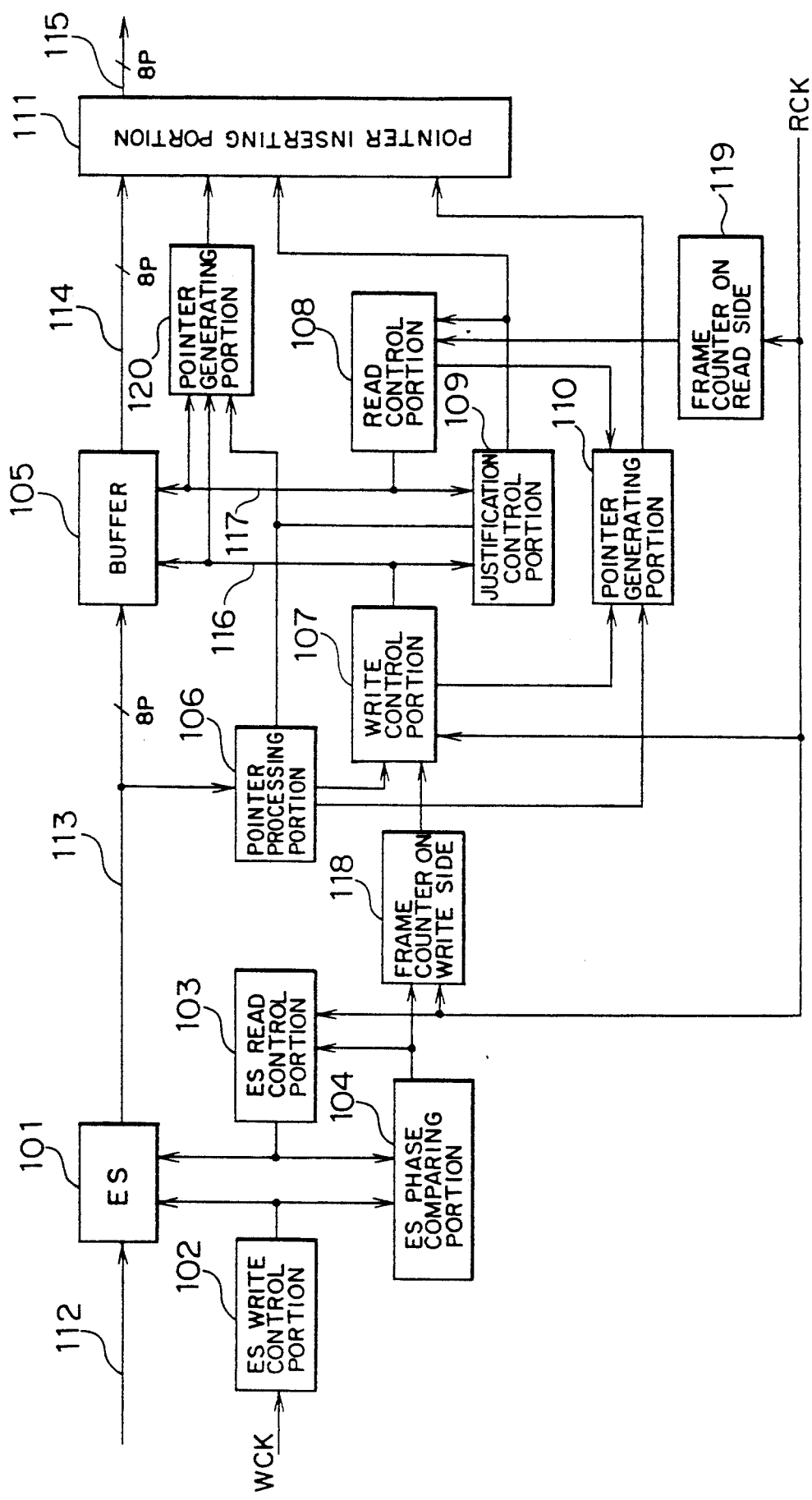
FIG. 6 is a block diagram showing a structure of a second embodiment.

In the next place, a second embodiment of the present invention will be described with reference to FIG. 6. A frame phase conversion circuit in the present embodiment does not process AU-32#1-#3 after separating by means of the separating portion 1 as performed in the first embodiment, but processes AU-32#1-#3 as they are multiplexed. In FIG. 6, a reference numeral 101 denotes a memory such as an ES for storing a signal multiplexed in the unit of byte on a highway 112, 102 denotes an ES write control portion which designates an address in writing a signal in the ES 101 in accordance with a write clock (WCK), 103 denotes an ES read control portion which designates an address in reading a signal out of the ES 101 in accordance with a read clock (RCK), 104 denotes an ES phase comparing portion which draws a comparison between a write address and a read address given to the ES 101, 105 denotes a buffer memory (hereinafter referred to as a buffer), 107 denotes a write control portion which designates an address in writing a signal in the buffer 105 by means of multi-processing, 108 denotes a read control portion which designates an address in reading a signal out of the buffer 105 by means of multi-processing, 109 denotes a justification control portion which controls above-mentioned read control portion 108 by the difference between a write address and a read address given to the buffer 105, 106 denotes a pointer processing portion which processes a pointer portion in a signal on a highway 113, 110 denotes a pointer generating portion which generates a pointer added to a signal which is read out of the buffer 105, 111 denotes a pointer inserting portion which inserts a pointer into a signal on a highway 114, 118 denotes a frame counter on a write side for controlling a write address of the buffer 105, 119 denotes a frame counter on a read side for controlling a read address of the buffer 105 and 120 denotes a pointer generating portion which generates a pointer added to a signal which is read out of the buffer. Those blocks shown in FIG. 6 that have the same designations as the blocks in FIG. 1 have the similar functions thereto. A signal on a highway 112 which is an object to be processed in the present invention is an STM-1 frame similarly to the first embodiment. Three VC-32#1-#3 containing information are contained in a frame by means of byte multiplexing, and pointers indicate head positions in the STM-1 frames of VC-32#1-#3, respectively. Incidentally, AU-32 added with a section overhead is referred to as AU-32 hereinafter for convenience' sake.

Returning to FIG. 6, above-described STM-1 frame signal is expanded in 8 bits in parallel and input under a state that byte synchronization is obtained from the highway 112. Here, respective AU-32s in the STM-1 frame are numbered as AU-32#1, AU-32#2 and AU-32#3 in transmitting order. The ES write control portion 102 operates in accordance with the WCK, and writes STM-1 in the ES 101. The ES read control portion 103 reads above-mentioned AU-#1-#3 out of the ES 101 consecutively in accordance with the RCK. Here, there is generally a difference as described above between the speeds of the WCK and the RCK, and the variation is absorbed when the difference becomes not to satisfy a predetermined reference value. Namely, the ES phase comparing portion 104 draws a comparison between the write address and the read address, detects approach by both, and expands the difference between both by rereading or read skipping of a designated address of the ES. This decision is made at a specific position of a read frame only once in one frame.

First, a case in which a write address gets near a read address because the RCK is faster as compared with the WCK will be described. When the ES phase comparing portion 104 detects that, for example, the difference between both addresses becomes less than a predetermined value in reading AU-32#1 out of the ES, ESPS byte is inserted into above-mentioned AU-32#1 by rereading a specific address of the ES. The position where the ESPS byte is inserted is shown in FIG. 4A. It is determined in respective AU-32#1 and #2 whether the ESPS byte is to be inserted or not. Only the VC-32 portion of each AU-32 is written in the buffer 105. Above-mentioned ESPS byte is not written in the buffer 105. As a result, when ESPS byte is generated, the write multi-processing phase of the buffer 105 changes, and AU positive justification is executed in case the ESPS byte is accumulated several times.

The operation thereof will be explained in detail hereunder. The buffer 105 is divided into banks in the unit of AU-32 which is multiplexed in the STM-1 frame. For example, the 10's are assigned to AU-32#1, the 20's are assigned to AU-32#2 and the 30's are assigned to AU-32#3 as the address. It is determined whether AUPJ is to be performed or not according to the difference between a write address in a buffer and a read address from the buffer. A phase of a write address having a relationship shown in FIG. 7B originally with a read address given to the buffer 105 changes as shown in FIG. 7C by rereading of the ES due to the difference in speed between the WCK and the RCK. Comparison between addresses is made on each AU between RBLK (read block) 1 and WBLK (write block) 1. Here, BLK is a unit of one STM-1. The difference between a read address and a write address of each AU-32 is 5 both in the case of FIG. 7B and in the case of FIG. 7C, thus showing no change. Furthermore, it is assumed that the speed difference between the WCK and the RCK is expanded, the phase of the write address which had a relationship shown in FIG. 7C with the read address given to the buffer 105 has changed as shown in FIG. 7D. In this case, since RBLK 1 is also compared with WBLK 1. Therefore, the difference between the read address and the write address in each AU-32 is not changed. It is assumed further that the speed difference between the WCK and the RCK is expanded and the phase of the write address which had a relationship shown in FIG. 7D with the read address given to the buffer 105 has changed as shown in FIG. 7E. In this case, a justification control portion 119 compares addresses between AU-32 of RBLK 3 and AU-32 corresponded by WBLK 1. At this time, a change in the difference between the read address and the write address of each AU-32 starts simultaneously for the first time. In a word, the difference which has been at a predetermined value 5 changes to 4 here. A justification control portion 109 detects such a change and executes AUPJ in respective AU-32#1-#3 when AU-32#1-#3 are read out in succession. Namely, a read control portion 108 hangs up reading out of the buffer 105 at a position of AUPJ byte specified in the CCITT recommendations G. 707, 708 and 709. With this, AUPJ byte is inserted. In case AUPJ has been already executed on the relevant AU-32, however, AUPJ is executed in a frame 4 frames after the relevant frame.

Next, a case in which a write address approaches a read address because the RCK is slower as compared with the WCK will be explained. When the ES phase comparing portion 104 detects that the difference between the write address and the read address exceeds a predetermined value in reading AU-32#1 for instance, read skipping of a designated address is made on above-mentioned AU-32#1. The position where ESNS is executed is shown in FIG. 5A. Only the VC-32 portion of each AU-32 is written in the buffer 105. At the time of executing above-mentioned ESNS, the frame length becomes shorter than normal by one byte portion. As a result, at the time of ESNS execution, approach between the write address and the read address of the buffer 105 is produced when the multi-processing phase of write to the buffer changes and the ESNS byte is accumulated for several times. The justification control portion 109 detects such an approach, and executes AUNJ.

The operation will be explained in detail hereunder. The buffer 105 is divided into banks in the unit of AU-32 which exists in the STM-1 frame. For example, the 10's are assigned to AU-32#1, the 20's are assigned to AU-32#2 and the 30's are assigned to AU-32#3 as the address. The write address and the read address for each of AU-32#1-#3 are initialized at values such as shown in FIG. 7A and FIG. 7B by means of the write control portion 102 and the read control portion 108 at the time of initialization. The decision whether justification is to be executed or not is made based on the difference between the write address and the read address. The phase of the write address which had a relationship shown in FIG. 8B at the beginning with the read address given to the buffer 105 changes as shown in FIG. 8C by read skipping or the ES due to the speed difference between the WCK and the RCK. Comparison of addresses is made between RBLK 1 and WBLK 1 for each AU. The difference between the read address and the write address of each AU-32 is 5 in both cases of FIG. 8B and FIG. 8C, thus showing no change. It is assumed that the speed difference between the WCK and the RCK is further expanded and the phase of the write address which has a relationship shown in FIG. 8C with the read address given to the buffer 105 has changed as shown in FIG. 8D. In this case, addresses are compared also between RBLK 1 and WBLK 1. Therefore, the difference between the read address and the write address of each AU-32 does not change. It is assumed that the speed difference between the WCK and the RCK is further expanded and the phase of the read address which had a relationship shown in FIG. 8D with the read address given to the buffer 105 has changed as shown in FIG. 8E. In this case, RBLK 0 is compared with WBLK 1. Here, the change is started simultaneously in the difference between the read address and the write address of each AU-32. In a word, the difference which has been at a predetermined value 5 becomes 6 here. The stuff control portion 109 detects such a change and executes AUNJ for each of AU-32#1-#3 in succession in reading AU-32#1-#3. Namely, the read control portion 108 performs reading out of the buffer 105 at the position of AUNJ specified in the CCITT recommendations G. 707, 708 and 709. In case AUNJ has been already executed on the relevant AU-32, however, AUNJ is executed 4 frames after the relevant frame.

Changing-over of a clock for synchronizing a signal in an ES is performed in the present embodiment by dividing a memory into an ES and a buffer. Further, decision whether rereading or read skipping of a specific address of an ES for wander absorption is to be executed or not is made with one phase comparator, thereby making it possible to generate justification in respective AU-32#1-#3 in a memory (buffer) at a latter stage. Thus, frame phase conversion is performed while holding the frame phase among respective AU-32#1-#3.

Figure 9:
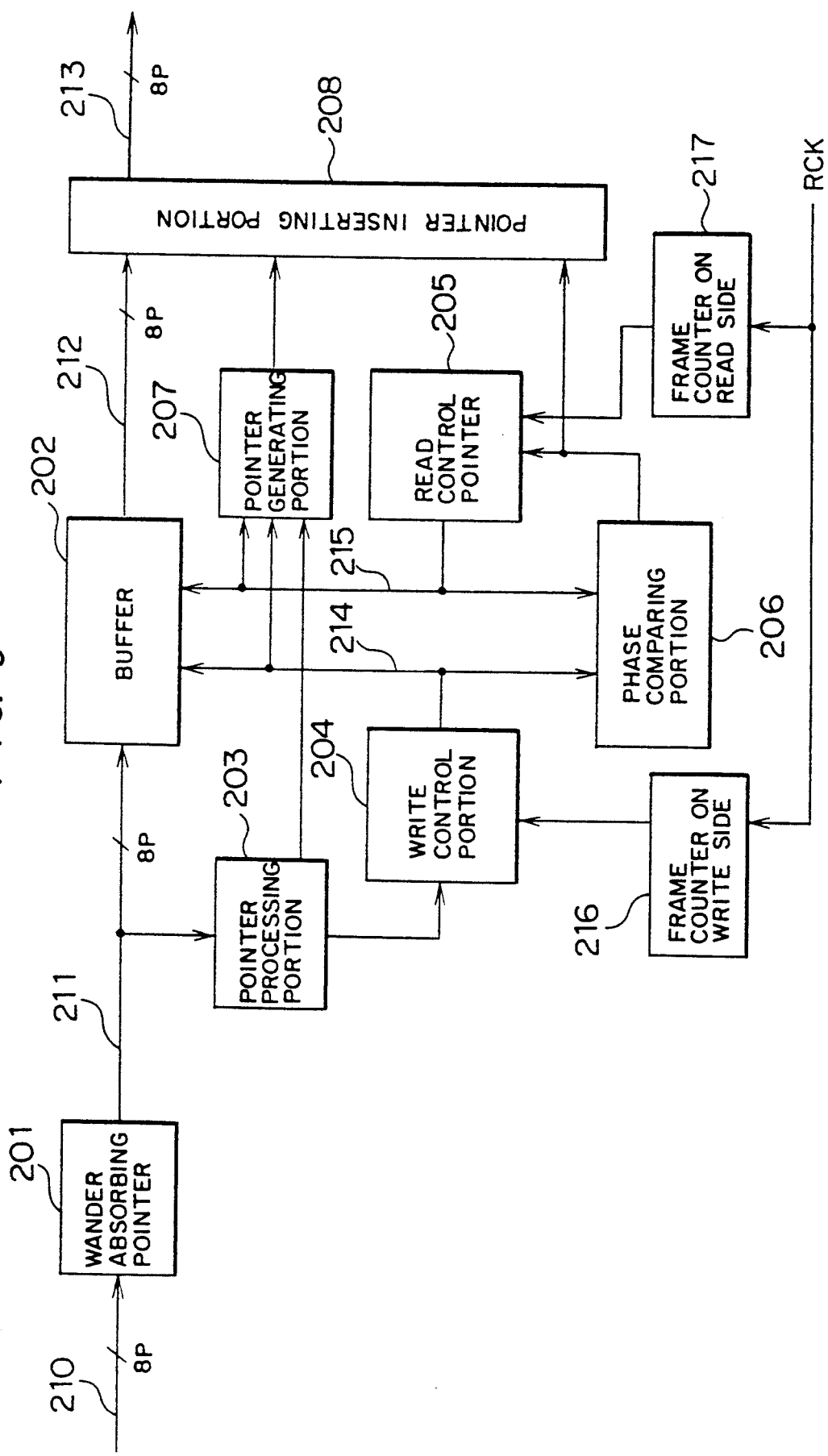
FIG. 9 is a block diagram showing a structure of a third embodiment.

A third embodiment of the present invention will be described with reference to FIG. 9. A frame phase conversion circuit of the present embodiment converts justification of pointer PTRs of AU-32 with justification in above-mentioned respective embodiments into justification of a pointer of TU (tributary unit)-21. In FIG. 9, 201 denotes a wander absorbing portion which absorbs wander of a received signal which has been developed on a highway 210 with 8 bits in parallel under a state that synchronization is obtained in the unit of byte and corresponds to the equipment shown in FIG. 1 or FIG. 6. Further, 202 denotes a buffer which stores a signal on a highway 211 by multi-processing, 203 denotes a pointer processing portion which applies multi-processing to a pointer of a signal on the highway 211, 204 denotes a write control portion which designates a write address when a signal on the highway 211 is written in the buffer 202, 205 denotes a read control portion which designates an address in reading a signal out of the buffer 202, 206 denotes a phase comparing portion which draws a comparison between a write address and a read address given to a buffer by means of multi-processing thereby to control above-mentioned read control portion 205, 207 denotes a pointer generating portion which generates a pointer to be added to a signal which is read out of the buffer 202, 208 denotes a pointer inserting portion which inserts a pointer value from the pointer generating portion into a signal on the highway 212, 216 denotes a frame counter on a write side for controlling a write address of the buffer 202 and 218 denotes a frame counter on a read side for controlling a read address of the buffer 202. Those parts that have the same designations as the blocks in FIG. 1 have similar functions thereto in embodiments hereafter. The highway 211 corresponds to the highway 41, 42 or 43 in the embodiment shown in FIG. 1.

Figure 10A:
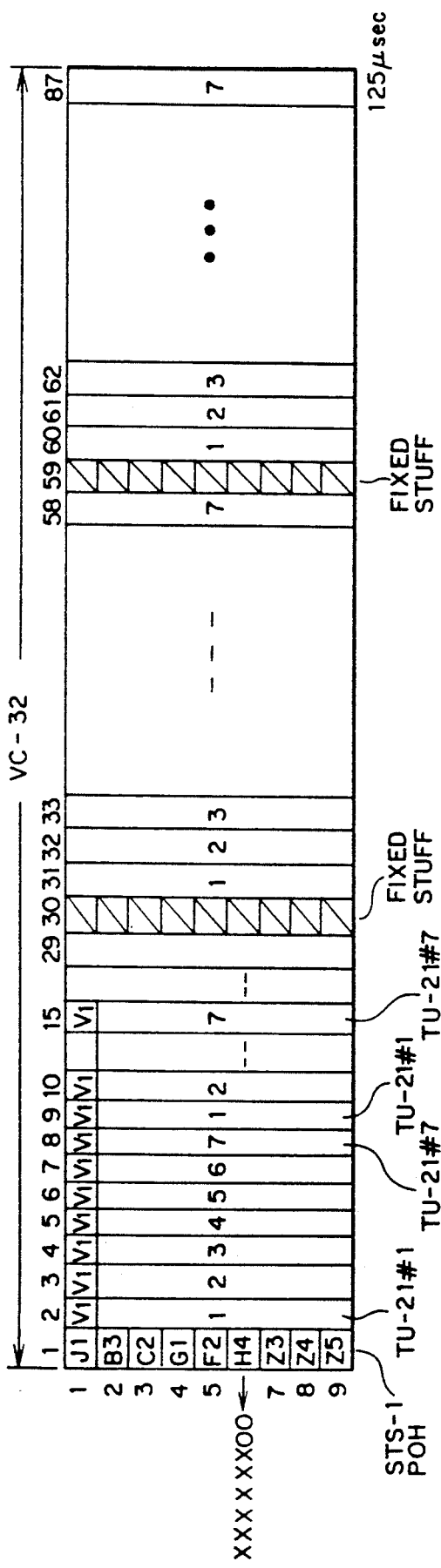
FIGS. 10A and 10B are configuration diagrams of a signal which becomes an object of a third embodiment.

Prior to explaining the operation of the above-described embodiment, a format of a signal on the highway 211 which is an object of processing will be explained. An signal which is an object to be processed is a frame in which AU-32 specified in the recommendations G. 707, 708 and 709 of the International Telegraph and Telephone Consulative Committe (CCITT) added with a section overhead (hereinafter referred to as an AU-32 frame). The type of a pointer of a TU employed in VC-32 is a TU-21 pointer. As shown in FIG. 10A, 12 sets including seven TU-21s containing information as one set are contained in one VC-32 frame by byte multiplexing. 7 pieces of TU-21s in each set are called TU-21#1-TU-21#7, respectively. Returning to FIG. 9, the above-described AU-32 frame signal is developed with 8 bits in parallel and input on the highway 210 under a state that byte synchronization is obtained. In the wander absorbing portion 201, wander is absorbed by means of execution of justification (AUPJ or AUNJ) in the AU-32 pointer portion by the system shown in the embodiment 1 or 2 sent out onto a highway 211. The pointer processing portion 203 extracts and detects the AU-32 pointer and detects the head of VC-32. With this, the position of TU-21#1 in the first set among 12 sets of TU-21s in VC-32 is known. The buffer 202 is divided into banks in each of respective TU-21#1-#7. For example, the 10's are assigned to TU-21#1, the 20's are assigned to TU-21#2, the 30's are assigned to TU-21#3, the 40's are assigned to TU-21#4, the 50's are assigned to TU-21#5, the 60's are assigned to TU-21#6 and the 70's are assigned to TU-21#7 as the address. Then, the write control portion 204 designates the write address to the buffer 202 for each of respective TU-21#1-#7. Further, the read control portion 205 designates the addresses in reading out of the buffer 202 from TU-21#1 to TU-21#7 successively. At this time, the write control portion 204 and the read control portion 205 are operated with the same clock RCK.

The most important of the functions of the circuit shown in FIG. 9 is a function of converting justification of the AU-32 pointer into TU justification of the TU-21 pointer. In this case, in order to preserve frame phase difference among respective TU-21#1-#7 in VC-32 and guarantee time sequence (hereinafter referred to as TSSI) so as to guarantee TSSI on the output side of the buffer among TU-21#1-#7 that are input to the buffer, it is required to execute justification of respective TU- 21#1-#7 at the same time. That is, 7 pieces of TU21s (TU-21#1-#7) exist in the case of the present embodiment, it is required to execute justification at the same time in 7 pieces of TU-21#1-#7. The operation thereof will be explained hereafter.

Figure 10B:
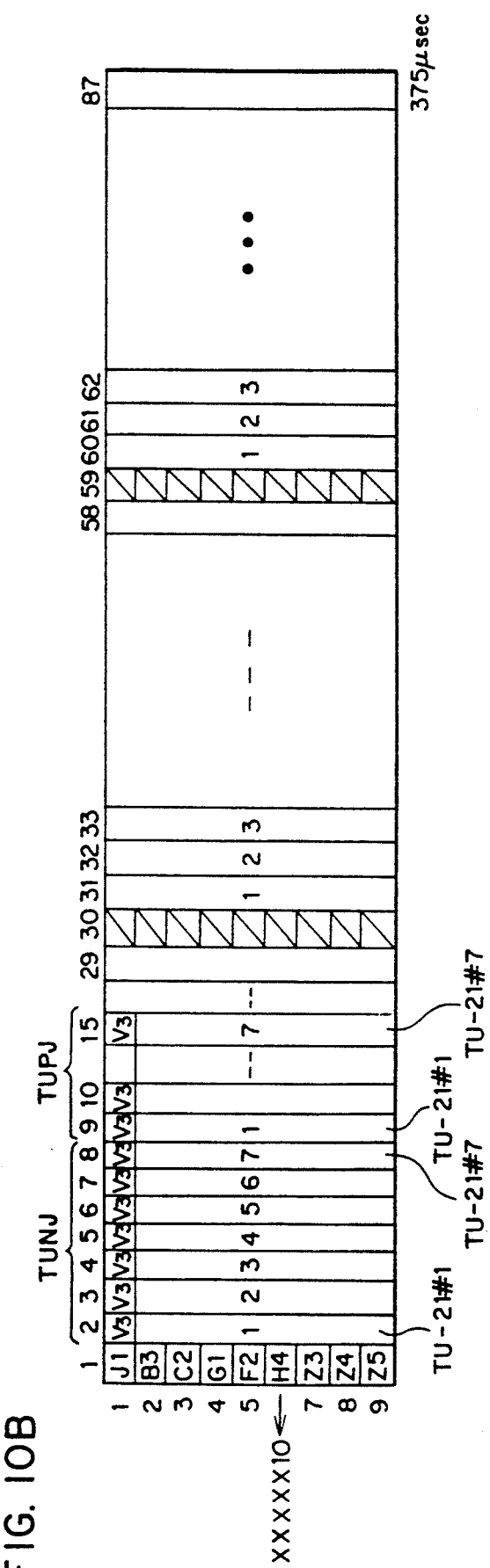

First, it is assumed that the phase relationship of the write address with the read address of each TU-21 (FIG. 11A) is as shown in FIG. 11B. Comparison between the read address and the write address is made among blocks mutually by forming one period portion of TU-21#1-#7 applied with time-division/multiplex periodically into a block as shown in FIGS. 11A thru 11D. In the case of FIG. 11B, the difference between the read address and the write address of each TU-21 is found to be 5 through a comparison between a first read block (RBLK 1) and a first write block (WBLK 1), and it is assumed that this is a normal relationship, i.e., a state in which justification is not executed. Now, when AUPJ exists in AU-32 under such a state, the AUPJ byte is not written into the buffer 202. Thus, writing of TU-21 is delayed by one byte. As a result, the phase relationship between the read address and the write address appears as shown in FIG. 11C. Since comparison of the phases between the read address and the write address of respective TU-21#1-#7 is also made between WBLK 1 and RBLK 1, the phase difference between both is also 5 in the whole TU-21s. Similarly, even in case AUPJ is generated six times in the AU-32, the phase difference between the read address and the write address does not change. A case in which AUPJ is generated seven times in the AU-32 is shown in FIG. 11D. In this case, phase comparison between the read address and the write address is made between WBLK 1 and RBLK 2. The phase difference becomes a predetermined value at 4 for instance at the same time in respective TU-21#1-#7, which is smaller than 5. Therefore, the phase comparing portion 206 can give instruction to execute positive justification (TUPJ) in respective TU-21#1-#7 to the read control portion 205. Namely, it is possible to distribute one each of 7 pieces of AUPJ equally in 7 pieces of TU-21#1-#7 consecutively at the time of reading VC-32 out of the buffer 202. The position where the TUPJ byte is inserted is the position of $V_3$ in the second TU-21#1-#7 of the third VC-32 frame (a position of $V_3$ in the 9th to 15th bytes) as shown in FIG. 10B.

In the above-described case, the operation when AUPJ of the AU-32 is converted into TUPJ of the TU-21 is described, but AUNJ of the AU-32 is converted into negative justification (TUNJ) of the TU-21 in a similar manner to the above. The position where TUNJ byte is inserted is at a position of $V_3$ of the first TU-21#1-#7 in the third VC-32 frame (at position of $V_3$ at the second to the eighth bytes) as shown in FIG. 10B. Since it is possible to convert AU justification of the AU-32 equally into justification of respective TU-21s in the present embodiment, TSSI among TU-21#1-#7 can be guaranteed, In the present embodiment, conversion into justification of TU-21 is described, but conversion into justification of TU-11, etc. can be made in a similar manner as above, A fourth embodiment of the present invention will be described with reference to FIG. 12. A frame phase conversion equipment in the present embodiment relates to pointer processing in case types of a signal processed by the frame phase conversion circuit and a signal which is input to the apparatus are different from each other. In FIG. 12, a reference numeral 300 denotes a pointer type determining portion which detects whether there is AU-4 pointer indication in a received signal which is multiplexed in the unit of byte on a highway 304 or not, 301 denotes a pointer inserting portion which inserts a pointer value at a position corresponding to AU-32 pointer into above-mentioned AU-4 when a received signal multiplexed in the unit of byte on the highway 304 is AU-4, 302 denotes a frame phase conversion circuit of the first or the second embodiment and 303 denotes an AU-4 pointer inserting portion which inserts an AU-4 pointer into a signal on 306.

Prior to explaining the operation of the above-mentioned embodiment, a format of a signal which is an object to be processed will be described. A signal which is an object to be processed in an ATM-1 frame specified in the recommendations G. 707, 708 and 709 of the International Telegraph and Telephone Consulative Committe (CCITT). The type of the AU used in the STM-1 frame is AU-4 or AU-32. In the case of AU-32, three AU-32s, i.e., AU-32#1 -#3 are contained in the STM-1. They are referred to as AU-32#1, AU-32#2 and AU-32#3 in the transmitting order.

Figure 13:
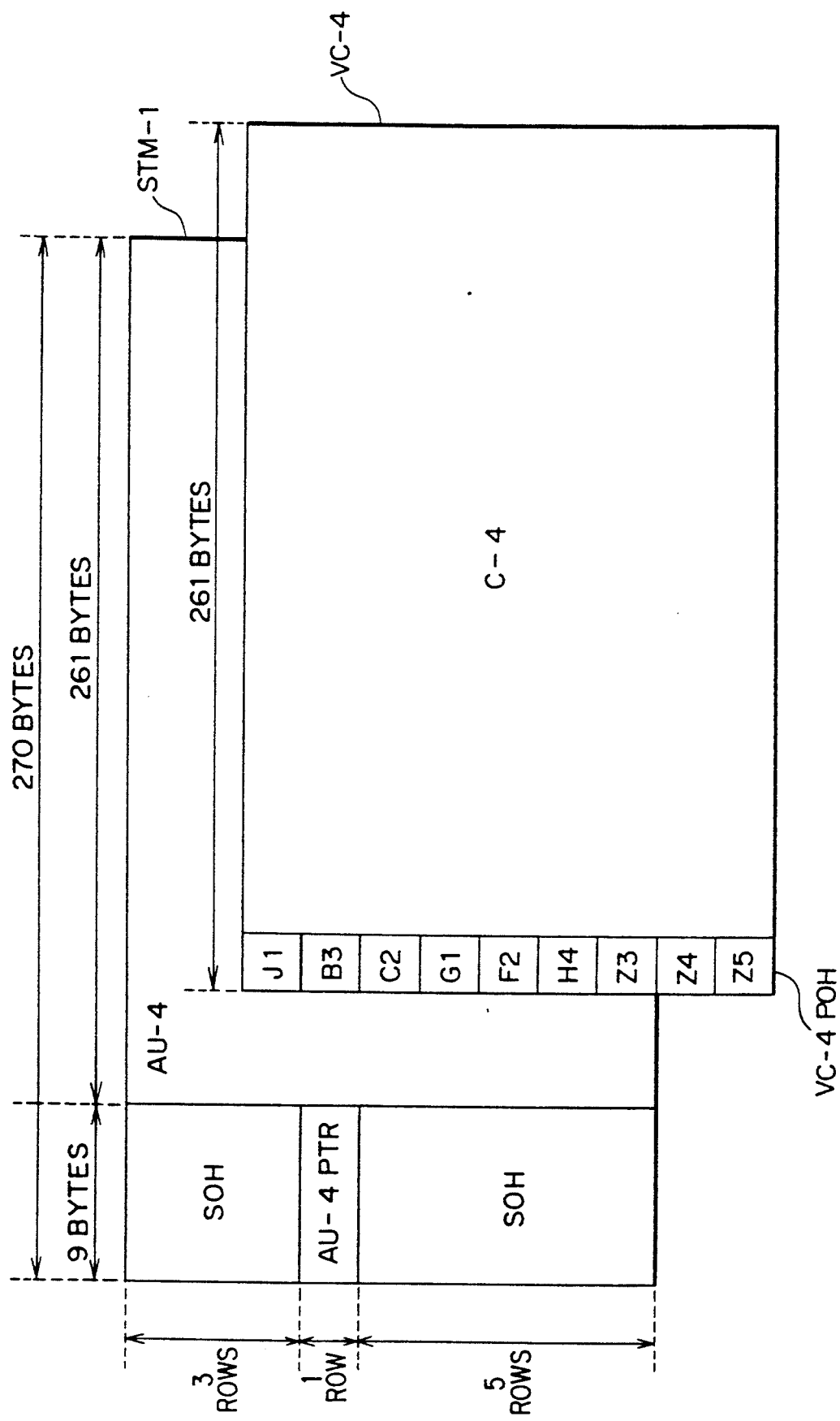
FIG. 13 is a configuration diagram of a signal which becomes an object of a fourth embodiment.

FIG. 13 shows an STM-1 frame having AU-4, AU-4 includes VC-4 having a capacity of three VC-32s and AU-4 pointer.

Returning to FIG. 12, an AU-4 pointer is equal to a case in which a pointer of AU-32#1 in case of AU-32 structure is valid and pointers of AU-32#2 and AU-32#3 are concatenation indication (hereafter called CI). Thus, when an STM-1 frame of an AU-4 structure and an STM-1 frame of AU-32 structure are processed in the same frame phase conversion circuit, processing is performed regarding that AU-32 has been multiplexed thrice in case an STM-1 frame having AU-4 structure is processed. The pointer type determining portion 300 discriminates whether a received signal is AU-4 or AU-32. In the case of AU-4, the pointer type determining portion 300 instructs the pointer inserting portion 301 to read a pointer value from a portion corresponding to the pointer of AU-32#1 in AU-4, and posts the pointer value in advance at a portion corresponding to the pointers of AU-32#2 and AU-32#3 in AU-4, and then, sends to the frame phase conversion circuit 302 shown in the embodiment 1 or the embodiment 2. The frame phase conversion circuit 302 sends a signal to the AU-4 pointer inserting portion 303 after completing processing. The AU-4 pointer inserting portion 303 determines whether to alter the pointer to AU-4 to keep AU-32 intact in accordance with an instruction from the pointer type determining portion 300. If the received signal is AU-4, the type of the pointer is altered to AU-4. With the operation described above, AU-4 pointer and AU-32 pointer can be processed in the same circuit.

A fifth embodiment of the present invention will be described with reference to FIG. 14. A frame phase conversion equipment in the present embodiment relates to a frame phase conversion equipment in case CI is contained in a received signal. In FIG. 14, a reference numeral 400 denotes a CI detecting portion which detects CI of a received signal multiplexed in the unit of byte on a highway 404,401 denotes a pointer inserting portion which inserts a pointer value into a CI portion of a received signal multiplexed in the unit of byte on a highway 404, 402 denotes a frame phase conversion circuit and 403 denotes a CI inserting portion.

Prior to explaining the operation of the above-described embodiment, a format of a signal which is an object to be processed will be described. A signal which is the object to be processed is an STM-1 frame specified in the recommendations G. 707, 708 and 709 of the International Telegraph & Telephone Consulative Committe (CCITT). The type of TU used in the STM-1 frame is TU-21. Respective TU-21s are called TU-21#1, TU-21#2, TU-21#3, TU-21#4, TU-21#5, TU-21#6 and TU-21#7 in the transmitting order. In the CCITT recommendations G. 707, 708 and 709, concatenation is prescribed as a direction for transmission while preserving a frame phase relationship among a plurality of signals. For example, if it is assumed that TU-21#1 and TU-21#2 have a relationship of concatenation with each other, CI is displayed at the pointer portion of TU-21#2. In case of processing concatenation, it is only required to process such that the frame phase relationship is preserved after inserting in advance a same value as the pointer value of TU-21#1 into the CI portion, i.e., the pointer portion of TU-21#2. Now, returning to FIG. 14, when the CI detecting portion 400 detects concatenation in TU-21#2, instruction is given to a pointer inserting portion 401 so as to insert the same value as the pointer of TU-21#1 into the pointer of TU-21#2, thereby to send to the frame phase conversion circuit 402 having the same structure as that shown in the embodiment 3. The CI inserting portion 403 displays CI again at the pointer of TU-21#2 for a signal completed with processing in the frame phase conversion circuit 402. Through the operation described above, it is possible to convert a signal having a relationship of concatenation into the same frame phase.

Figure 15:
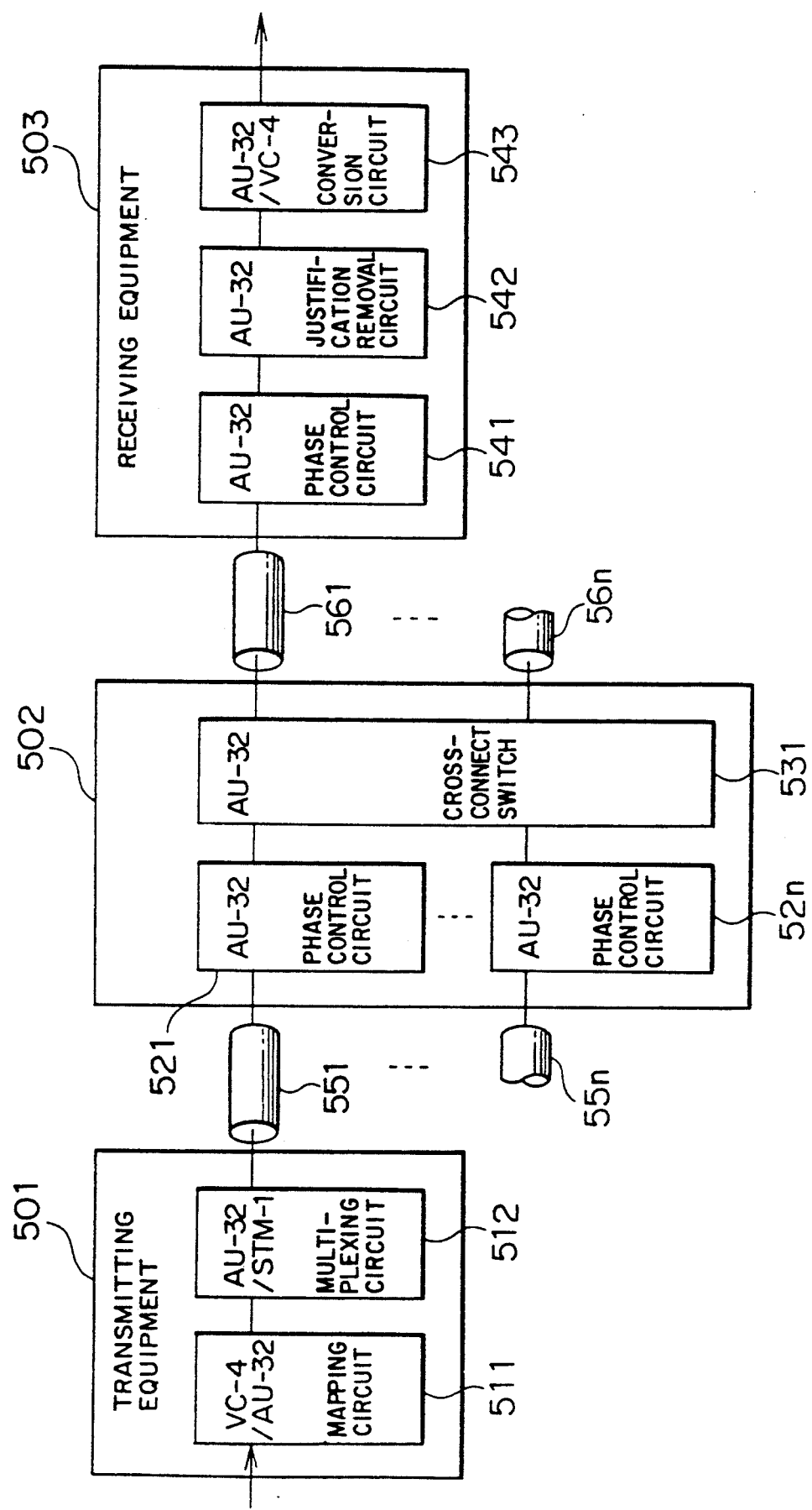
FIG. 15 is a block diagram showing a structure of a sixth embodiment.

A sixth embodiment of the present invention will be described with reference to FIG. 15. The present embodiment is a transmission system of a broad-band signal applied with the justification control circuit which has been described so far. In the figure, a reference numeral 501 denotes a transmitting equipment, 502 denotes a cross-connect equipment, 503 denotes a receiving equipment and 551-55n and 561-56n denote n lines of transmission lines, respectively. The transmitting equipment 501 is composed of a VC-4/AU-32 mapping circuit 511 and an AU-32/STM-1 multiplexing circuit 512. The cross-connect equipment 502 is composed of n pieces of AU-32 phase control circuits 521-52n and an AU-32 cross-connect switch 531. Further, the receiving equipment 503 is composed of an AU-32 phase control circuit 541, an AU-32 justification removal circuit 542 and an AU-32/VC-4 conversion circuit 543.

Next, the operation of the present embodiment will be described. In the VC-4/AU-32 mapping circuit 511, VC-4 having information quantity of approximately 150 Mb/s is received and mapping is performed in three pieces' portion of AU-32 each having a capacity of approximately 50 Mb/s. In the STM-1 multiplexing circuit 512, these three pieces of AU-32#1-#3 are multiplexed into one piece of STM-1, which is sent to a transmission line 551. In the AU-32 phase control circuit 521, STM-1 is received from the transmission line 551, and frame phase of respective AU-32#1-#3 are made to coincide with the frame phase of the cross-connect equipment 502. At this time, justification is applied simultaneously to respective AU-32#1-#3 on the transmission line 551 using the justification control method in the embodiments which have been described previously. In the AU-32 cross-connect switch 531, signal received from various lines are switched by direction of destination in the unit of AU-32 and sent to transmission lines 561-56n in the form of STM-n. In the AU-32 phase control circuit 541, STM-1 is received from a transmission line 561, and frame phases of respective AU-32s are made to coincide with the frame phase of the receiving equipment 502. At this time, justification is applied simultaneously to respective AU-32s on the transmission line 561 using the justification control method in the embodiments which have been described previously. In the AU-32 justification removal circuit 542, justification bytes of three pieces of AU-32#1-#3 are removed using the buffer. Since justification is executed simultaneously in respective AU-32#1-#3, the processing of removing the justification byte is performed on three pieces of AU-32#1-#3 collectively. In the AU-32/VC-4 conversion circuit 543, those data applied with mapping in three pieces of AU-32#1-#3 are converted into one VC-4 and output.

In the present embodiment, a broad-band signal is transmitted using a plurality of administration units without using concatenation. Accordingly, there is such an effect that it is possible to omit processing of concatenation in an equipment in a network such as a cross-connect equipment.

The present invention is not limited to above-described STM-1 frame signal, but is also applicable to other frame signals according to the CCITT recommendations.

We claim:
1. A method of converting a frame phase of a signal having a frame structure which contains N (N: an integer 2 or above) pieces of frames applied with time-division/multiplex, comprising steps of:
  giving said N pieces of frames to N pieces of memories, respectively;
  giving a write address independently to said respective memories so as to write said N pieces of frames in said respective memories in a write phase same as a phase in said signal;
  giving a read address independently to said respective memories so as to read said N pieces of frames out of said respective memories in a read phase same as said write phase;
  setting a difference between said write and read addresses in each of said respective memories identical with each other under an initial state, said difference corresponding to a difference in phase between said write and read addresses; and
  executing a justificating operation on a frame which is read out of a memory in accordance with a difference between existing write and read addresses in each memory.

2. A method of converting a frame phase of a signal having a frame structure according to claim 1, wherein said difference between said write and read addresses in which said justification operation is not executed in said respective memories shows only one value.

3. A method of converting a frame phase of a signal having a frame structure according to claim 1, wherein:
  said write address to said respective memories is given in response to a first common clock signal; and
  said read address to said respective memories is given in response to a second common clock signal.

4. A method of converting a frame phase of a signal having a frame structure according to claim 1, wherein:
  said write address to said respective memories is given in response to a first common clock signal;
  said read address to said respective memories is given in response to a second common clock signal; and a difference between said first common clock signal and said second common clock signal is absorbed by execution of said justification operation.

5. A method of converting a frame phase of a signal having a frame structure according to claim 1, wherein said signal having said frame structure is an administration unit or a tributary unit specified in the CCITT recommendation G. 709.

6. A method of converting a frame phase of a signal having a frame structure according to claim 1, wherein said step of giving said N pieces of frames to said N pieces of memories, respectively, comprises the steps of:
    separating said N pieces of frames into frames each containing one frame; and
    giving said separated respective frames to said N pieces of memories in a same phase, respectively.

7. A method of converting a frame phase of a signal having a frame structure according to claim 1, wherein said step of executing a justification operation includes a step of executing a justification operation in units of frame AU-32 after posting a pointer value of AU-4 at positions corresponding to pointers of three pieces of frames AU-32 in said AU-4 in case said frame is AU-4 specified in the CCITT recommendation G. 709.

8. A method of converting a frame phase of a signal having a frame structure according to claim 1, wherein said step of executing a justification operation includes a step of executing a justification operation for respective frames after giving a same pointer value as that of a head frame among said N pieces of frames to a pointer of a signal applied with concatenation when concatenation specified in the CCITT recommendation G. 709 exists among said N pieces of frames.

9. A method of converting a frame phase of a signal having a frame structure which contains N (N: an integer 2 or above) pieces of frames applied with time-division/multiplex, comprising steps of:
    giving said N pieces of frames to N pieces of first memories, respectively;
    giving a first write address independently to said respective first memories so that said N pieces of frames are written in said respective first memories in a first write phase same as a phase in said signal;
    giving a first read address independently to said respective first memories so that said N pieces of frames are read out of said respective first memories in a first read phase same as said first write phase;
    setting a first difference between said first write and read address in said respective first memories identical under an initial state, said first difference corresponding to a difference in phase between said first write and read addresses;
    performing rereading or read skipping of a frame of a specific address of a first memory in accordance with a difference between existing first write and read addresses in each of said respective first memories;
    giving said N pieces of frames which have been read out of said respective first memories to N pieces of second memories, respectively;
    giving a second write address independently to said respective second memories so that said N pieces of frames which have been read out of said respective first memories are written in said respective second memories in a second write phase same as said first read phase;
    giving a second read address independently to said respective second memories so that said N pieces of frames are read out of said respective second memories in a second read phase same as said second write phase to said respective second memories;
    setting a second difference between said second write and read addresses in said respective second memories identical under an initial state, said second difference corresponding to a difference in phase between said second write and read addresses; and
    executing a justification operation for a frame which is read out of a second memory in accordance with a difference between existing second write and read addresses in said respective second memories.

10. A method of converting a frame phase of a signal having a frame structure according to claim 9, wherein difference between said first write and read addresses, in which neither of read skipping or rereading are performed in said respective first memories shows a single value.

11. A method of converting a frame phase of a signal having a frame structure according to claim 9, wherein:
    said first write address to said respective first memories is given in response to a first common clock signal; and
    said first read address to said respective first memories and said second write and read addresses to said respective second memories are given in response to a second common clock signal.

12. A method of converting a frame phase of signal having a frame structure according to claim 9, wherein said difference between said second write and read addresses in which said justification operation is not executed in said respective second memories shows a single value.

13. A method of converting a frame phase of a signal having a frame structure according to claim 9, wherein:
    said first write address to said respective first memories is given in response to a first common clock signal;
    said first read address to said respective first memories is given in response to a second common clock signal; and
    a difference between frequencies of said first common clock signal and said second common clock signal is absorbed by executing said performing rereading and read skipping step.

14. A method of converting a frame phase of a signal having a frame structure according to claim 9, wherein said signal having said frame structure is an administration unit or a tributary unit specified in the CCITT recommendation G. 709.

15. A method of converting a frame phase of a signal having a frame structure according to claim 9, wherein the step of giving said N pieces of frames to said N pieces of first memories, respectively, includes a step of separating said N pieces of frames into one frame each, and a step of giving separated respective frames to said N pieces of first memories in a same phase, respectively.

16. A method of converting a frame phase of a signal having a frame structure according to claim 9, wherein said step of executing a justification operation includes a step of executing a justification operation in units of frame AU-32 after posting a pointer value of AU-4 at positions corresponding to pointers of three pieces of frames AU-32 in said AU-4 in case said frame is AU-4 specified in the CCITT recommendation G. 709.

17. A method of converting a frame phase of a signal having a frame structure according to claim 9, wherein said step of executing a justification operation includes a step of executing a justification operation for respective frames after giving a same pointer value as that of a head frame among said N pieces of frames to a pointer of a signal applied with concatenation when concatenation specified in the CCITT recommendation G. 709 exists among said N pieces of frames.

18. An equipment for converting a frame phase of a signal having a frame structure which contains N (N: an integer 2 or above) pieces of frames applied with time-division/multiplex, comprising:

N pieces of memories which store said N pieces of frames, respectively;

a write address generating means which gives a write address independently to said respective memories so that said N pieces of frames are written in said respective memories in a write phase same as a phase in said signal;

a read address generating means which gives a read address independently to said respective memories so that said N pieces of frames are read out of said respective memories in a read phase same as said write phase;

means for setting a difference between said write and read addresses in said respective memories identical under an initial state, said difference corresponding to a difference in phase between said write and second addresses; and means for executing a justification operation independently from a frame which is read out of a memory in accordance with a difference between existing write and read addresses in said respective memories.

19. An equipment for converting a frame phase of a signal having a frame structure according to claim 18, wherein said means for executing a justification operation include means for setting a difference between a write address and a read address in which justification in said respective memories is not executed at a single value.

20. An equipment for converting a frame phase of a signal having a frame structure according to claim 18, wherein:

said write address generating means includes means for giving said write address to said respective memories in response to a first common clock signal; and said read address generating means includes means for giving said read address to said respective memories in response to a second common clock signal.

21. An equipment for converting a frame phase of a signal having a frame structure according to claim 18, wherein:

said write address generating means includes means for giving said write address to said respective memories in response to a first common clock signal;

said read address generating means includes means for giving said read address to said respective memories in response to a second common clock signal; and said means for executing a justification operation includes means for absorbing a difference in frequency between said first common clock signal and said second common clock signal by execution of said justification operation.

22. An equipment for converting a frame phase of a signal having a frame structure according to claim 18, wherein said signal having said frame structure is an administration unit or a tributary unit specified in the CCITT recommendation G. 709.

23. An equipment for converting a frame phase of a signal having a frame structure according to claim 18, further comprising:

means for separating said N pieces of frames of said signal into one frame each; and means for giving these separated respective frames to said N pieces of memories in a same phase, respectively.

24. An equipment for converting a frame phase of a signal having a frame structure according to claim 18, further comprising:

a circuit for giving a frame to said memories after posting a pointer value of AU-4 of said signal at positions corresponding to pointers of three pieces of frames AU-32 in said AU-4 in case said frame is AU-4 specified in the CCITT recommendation G. 709; and a circuit for altering AU-32 pointer values of respective frames which have been read out of said memories to the pointer value of AU-4.

25. An equipment for converting a frame phase of a signal having a frame structure according to claim 18, further comprising:

a circuit for giving said frames to said memories after giving a same pointer value as that of a head frame among said N pieces of frames to a pointer of said frame of said received signal applied with concatenation when concatenation specified in the CCITT recommendation G. 709 exists among said N pieces of frames of said received signal; and a circuit for adding concatenation indication again to said frame applied with concatenation which has been read out of said memory.

26. An equipment for converting a frame phase of a signal having a frame structure containing N (N: an integer 2 or above) pieces of frames applied with time-division/multiplex, comprising:

N pieces of first memories which store said N pieces of frames, respectively;

means for giving a first write address independently to said respective first memories so that said N pieces of frames are written in said respective first memories in a first write phase same as a phase in said signal;

means for giving a first read address independently to said respective first memories so that said N pieces of frames are read out of said respective first memories in a first read phase same phase as said first write phase;

means for setting a first difference between said first write and read addresses in respective first memories identical under an initial state, said first difference corresponding to a difference in phase between said first write and read address;

means for performing rereading or read skipping of a frame of a specific address of a first memory in accordance with a difference between existing present first write and read addresses in said respective first memories;

N pieces of second memories which store said N pieces of frames that have been read out of said first memories;

means for giving a second write address independently to said respective second memories so that said N pieces of frames that have been read out of said respective first memories are written in said respective second memories in a second write phase same as said first read phase.

means for giving a second read address independently to said respective second memories so that said N pieces of frames are read out of said respective second memories in a second read phase same as said second write phase to said respective second memories;

means for setting a second difference between said second write and read addresses in said respective second memories identical under an initial state, said second difference corresponding to a difference in phase between said second write and read addresses; and means for executing a justification operation on a frame which is read out of a second memory in accordance with a difference between existing second write and read addresses in respective second memories.

27. An equipment for separating a frame phase of a signal having a frame structure containing N (N: a positive integer) pieces of frames applied with time-division/multiplex, comprising:

a separating circuit which separates said signal having said frame structure into said N pieces of frames and sends them to N lines of highways, respectively;

N pieces of first memories which store said frames on said N lines of highways, respectively;

one piece of write control circuit which designates a common write address in writing said frames in said N pieces of first memories in accordance with a first clock;

one piece of read control circuit which designates a common read address in reading said frames out of said N pieces of memories in accordance with a second clock;

a phase controller which performs rereading or read skipping of a specific address of said respective first memories at a same time;

N pieces of second memories which store said N pieces of frames that have been read out of said N pieces of first memories;

N pieces of second write control circuits which designate write addresses in writing said frames in each of said N pieces of second memories in accordance with said second clock;

N pieces of second read control circuits which designate read addresses in reading said frames out of said N pieces of second memories in accordance with said second clock; and justification control portions which execute a justification operation independently for output frames of respective second memories in each of said N pieces of second memories in accordance with a difference between write and read addresses given thereto, said difference corresponding to a difference in phase between said write and read addresses.

28. An equipment for separating a frame phase of a signal having a frame structure containing N (N: a positive integer) pieces of frames applied with time-division/multiplex, comprising:

a separating circuit which separates said signal having said frame structure into said N pieces of frames and sends them to N lines of highways, respectively;

N pieces of memories which store said frames on said N lines of highways in accordance with a first clock;

N pieces of write control circuits which designate a write address in writing said frames in said N pieces of memories in accordance with said first clock;

N pieces of read control circuits which designate a read address in reading said frames out of said N pieces of memories in accordance with a second clock; and justification control portions which execute a justification operation independently for output frames of respective memories in each of said N pieces of memories in accordance with a difference between write and read addresses given thereto, said difference corresponding to a difference in phase between said write and read addresses.

29. An equipment for separating a frame phase of a signal having a frame structure containing N (N: a positive integer) pieces of frames applied with time-division/multiplex, comprising:

a first memory which receives said signal having said frame structure and stores said N pieces of frames under multiplex state;

a first write control circuit which designates a first write address of each frame in writing said N pieces of frames successively in said first memory under a multiplex state in accordance with a first clock;

a first read control circuit which designates a first read address of each frame in reading said N pieces of frames successively under a multiplex state out of said first memory in accordance with a second clock;

a first phase controller which executes rereading or read skipping of a specific address for said N pieces of frames in accordance with a first difference in phase between said first write and read addresses given to said first memory;

a second memory which stores said frames which have been read out of said first memory under a multiplex state;

a second write control circuit which designates a second write address of each frame in writing said N pieces of frames successively under a multiplex state in said second memory in accordance with said second clock;

a second read control circuit which designates a second read address of each frame in reading said N pieces of frames under a multiplex state out of said second memory in accordance with said second clock; and a second phase control portion which executes a justification operation on each frame in accordance with a second difference in phase between said second write and read addresses for each frame given to said second memory.

30. An equipment for separating a frame phase of signal having a frame structure containing N (N: a positive integer) pieces of frames applied with time-division/multiplex, comprising:

a memory which receives said signal having said frame structure and stores said N pieces of frames by multi-processing;

a write control circuit which designates a write address of each frame in writing said N pieces of frames in said memory by multi-processing in accordance with a first clock;

a read control circuit which designates a read address in reading said signal out of said memory by multi-processing in accordance with a second clock; and a phase control portion which executes a justification operation independently in each frame in accordance with a difference between write and read addresses in each of said N pieces of frames received by said memory, said difference corresponding to a difference in phase between said write and read addresses.

31. An equipment for separating a frame phase of a signal having a frame structure according to claim 30, wherein said frame is an administration unit or a tributary unit specified in the CCITT recommendation G. 709.

32. An equipment for separating a frame phase of a signal having a frame structure according to claim 30, further comprising:

a circuit which gives a frame to said memory after posting a pointer value of AU-4 of said signal at positions corresponding to pointers of three pieces of frames AU-32 in said AU-4 in case said frame is AU-4 specified in the CCITT recommendation G. 709; and a circuit for altering AU-32 pointer values of respective frames which have been read out of said memory to the pointer value of AU-4.

33. An equipment for separating a frame phase of a signal having a frame structure according to claim 30, further comprising:

a circuit which, when concatenation specified in the CCITT recommendation G. 709 exists among said N pieces of frames of said signal, gives a same pointer value as a head frame among said N pieces of frames to a pointer of a frame applied with concatenation of said signal and gives said frame to said memory thereafter; and a circuit which adds concatenation indication again to said frame applied with concatenation which has been read out of said memory.

34. An equipment for converting a frame phase of an administration unit (hereinafter referred to as AU) specified in the CCITT recommendation G. 709 which contains N (N: a positive integer) pieces of virtual container level 2 or level 1 (hereinafter referred to as VC-2 and VC-1, respectively) frames that are applied with time-division/multiplex, comprising:

a memory which stores said N pieces of VC-2 or VC-1 frames by multi-processing;

a write control circuit which designates respective write addresses in writing VC-2 or VC-1 frames in said memory by multi-processing;

a read control circuit which indicates a read address in reading VC-2 or VC-1 frames out of said memory; and a phase control portion which obtains a difference in phase between a write address and a read address in each of VC-2 or VC-1 frames and executes a justification operation of a tributary unit-2 or a tributary unit-1 when the difference is other than a specific value.

35. A method of converting a frame phase of a signal having a frame structure which contains N (N: an integer 2 or above) pieces of frames, said method comprising the steps of:

separating a signal into a plurality of administration unit frames of tributary unit frames each consisting of a virtual container specified in the CCITT recommendation G. 709 which is smaller than a capacity of said signal and a pointer and applying mapping;

transmitting with multiplexing said plurality of administration unit frames or plurality of tributary unit frames on a same transmission line;

having a plurality of administration unit frames or a plurality of tributary unit frames on the same transmission line pass through a relay transmission equipment which applies a same justification process to said plurality of administration unit frames or said plurality of tributary unit frames; and fetching said signal from said plurality of administration unit frames or said plurality of tributary unit frames on a receiving side.

* * * * *